US010071801B2

(12) United States Patent
North et al.

(10) Patent No.: US 10,071,801 B2
(45) Date of Patent: Sep. 11, 2018

(54) TRI-ROTOR AIRCRAFT CAPABLE OF VERTICAL TAKEOFF AND LANDING AND TRANSITIONING TO FORWARD FLIGHT

(71) Applicant: The United States of America as represented by the Administrator of the National Aeronautics and Space Administration, Washington, DC (US)

(72) Inventors: David D. North, Williamsburg, VA (US); Mark J. Aull, Cincinatti, OH (US); William J. Fredericks, Williamsburg, VA (US); Mark D. Moore, Williamsburg, VA (US); Paul M. Rothhaar, Newport News, VA (US); William T. Hodges, Yorktown, VA (US); Zachary R. Johns, Virginia Beach, VA (US)

(73) Assignee: THE UNITED STATES OF AMERICA AS REPRESENTED BY THE ADMINISTRATOR OF NASA, Washington, DC (US)

(*) Notice: Subject to any disclaimer, the term of this patent is extended or adjusted under 35 U.S.C. 154(b) by 0 days.

(21) Appl. No.: 15/080,167

(22) Filed: Mar. 24, 2016

(65) Prior Publication Data
US 2016/0200436 A1 Jul. 14, 2016

Related U.S. Application Data

(63) Continuation-in-part of application No. 14/121,001, filed on Aug. 13, 2014.
(Continued)

(51) Int. Cl.
*B64C 29/00* (2006.01)
*B64C 5/02* (2006.01)
(Continued)

(52) U.S. Cl.
CPC ............ *B64C 29/0033* (2013.01); *B64C 5/02* (2013.01); *B64C 25/52* (2013.01);
(Continued)

(58) Field of Classification Search
CPC ............ B64C 29/0033; B64C 29/0075; B64C 29/0083; B64C 2201/088; B64C 1/28;
(Continued)

(56) References Cited

U.S. PATENT DOCUMENTS 2,462,201 A 2/1949 Kilgore et al.
2,783,956 A 3/1957 Harriss
(Continued)

FOREIGN PATENT DOCUMENTS

DE 102005003608 A1 8/2006
DE 102007012875 A1 9/2008
(Continued)

OTHER PUBLICATIONS

Fredericks, W. J., "Conceptual Design of a Vertical Takeoff and Landing Unmanned Aerial Vehicle with 24-hr Endurance," AUVSI Unmanned Systems Conference, Aug. 23-26, 2010, pp. 1-17, Denver, CO.
(Continued)

*Primary Examiner* — Richard R Green
(74) *Attorney, Agent, or Firm* — Rubin W. Edwards; Mark P. Dvorscak

(57) ABSTRACT

Systems, methods, and devices provide a vehicle, such as an aircraft, with rotors configured to function as a tri-copter for vertical takeoff and landing ("VTOL") and a fixed-wing vehicle for forward flight. One rotor may be mounted at a front of the vehicle fuselage on a hinged structure controlled by an actuator to tilt from horizontal to vertical positions. Two additional rotors may be mounted on the horizontal surface of the vehicle tail structure with rotor axes oriented
(Continued)

vertically to the fuselage. For forward flight of the vehicle, the front rotor may be rotated down such that the front rotor axis may be oriented horizontally along the fuselage and the front rotor may act as a propeller. For vertical flight, the front rotor may be rotated up such that the front rotor axis may be oriented vertically to the fuselage, while the tail rotors may be activated.

15 Claims, 20 Drawing Sheets

Related U.S. Application Data

(60) Provisional application No. 61/865,347, filed on Aug. 13, 2013, provisional application No. 62/137,634, filed on Mar. 24, 2015.

(51) Int. Cl.
*B64C 25/52* (2006.01)
*B64D 27/24* (2006.01)
*B64C 39/02* (2006.01)
*B64D 27/02* (2006.01)

(52) U.S. Cl.
CPC ........ *B64C 29/0025* (2013.01); *B64C 39/024* (2013.01); *B64D 27/24* (2013.01); *B64C 2201/042* (2013.01); *B64C 2201/044* (2013.01); *B64D 2027/026* (2013.01); *Y02T 50/44* (2013.01); *Y02T 50/64* (2013.01)

(58) Field of Classification Search
CPC ....... B64C 1/30; B64C 39/003; B64C 39/005; B64C 39/08; B64C 3/385; B64D 27/02; B64D 27/04; B64D 2027/026
See application file for complete search history.

(56) References Cited

U.S. PATENT DOCUMENTS

| | | | | |
|---|---|---|---|---|
| 2,793,827 | A * | 5/1957 | Ries | B64C 35/00 244/102 R |
| 2,980,368 | A | 4/1961 | Jakimiuk et al. | |
| 2,994,492 | A * | 8/1961 | Dobson | B64C 29/0033 244/66 |
| 3,582,021 | A * | 6/1971 | Pender | B64C 29/02 244/17.19 |
| 4,149,688 | A | 4/1979 | Miller, Jr. | |
| 4,436,261 | A * | 3/1984 | Koleff | B64C 29/0033 244/1 R |
| 4,605,185 | A | 8/1986 | Reyes | |
| 4,900,226 | A | 2/1990 | De Vries | |
| 4,936,526 | A * | 6/1990 | Gries | B64C 11/28 244/53 R |
| 5,082,204 | A | 1/1992 | Croston | |
| 5,823,468 | A | 10/1998 | Bothe | |
| 6,095,945 | A | 8/2000 | Graf | |
| 6,293,491 | B1 * | 9/2001 | Wobben | B64C 27/00 244/17.23 |
| 7,131,613 | B2 | 11/2006 | Kelly | |
| 8,066,219 | B2 * | 11/2011 | Patt | B64C 29/0033 244/12.4 |
| 8,469,306 | B2 | 6/2013 | Kuhn, Jr. | |
| 8,733,690 | B2 | 5/2014 | Bevirt et al. | |
| 8,800,912 | B2 | 8/2014 | Oliver | |
| 9,085,355 | B2 * | 7/2015 | DeLorean | B64C 29/0033 |
| 9,096,312 | B2 | 8/2015 | Moxon | |
| 2004/0118969 | A1 | 6/2004 | MacCready et al. | |
| 2005/0014605 | A1 | 1/2005 | Ries-Mueller | |
| 2006/0254255 | A1 | 11/2006 | Okai et al. | |
| 2007/0124037 | A1 | 5/2007 | Moran | |
| 2008/0184906 | A1 | 8/2008 | Kejha | |
| 2010/0286884 | A1 | 11/2010 | Bunn | |
| 2010/0301168 | A1 * | 12/2010 | Raposo | B64C 27/20 244/171.2 |
| 2011/0001020 | A1 | 1/2011 | Forgac | |
| 2011/0066338 | A1 | 3/2011 | Andrasko et al. | |
| 2011/0315809 | A1 * | 12/2011 | Oliver | B64C 29/0033 244/12.4 |
| 2012/0012692 | A1 | 1/2012 | Kroo | |
| 2012/0046841 | A1 | 2/2012 | Wurthner et al. | |
| 2013/0094963 | A1 | 4/2013 | Rolt | |

FOREIGN PATENT DOCUMENTS

| | | | |
|---|---|---|---|
| DE | 102009028242 A1 | 2/2011 | |
| DE | 102009045091 A1 | 3/2011 | |
| DE | 102010003673 A1 | 10/2011 | |
| EP | 2570345 A1 * | 3/2013 | ......... B64C 29/0033 |
| EP | 2581308 A2 | 4/2013 | |
| GB | 2497136 A | 6/2013 | |
| WO | 2009060241 A1 | 5/2009 | |
| WO | 2010121861 A1 | 10/2010 | |
| WO | 2010128898 A1 | 11/2010 | |

OTHER PUBLICATIONS

Fredericks, W. J., "Aircraft Conceptual Design Using Vehicle Sketch Pad," 48th AIAA Aerospace Sciences Meeting, Jan. 4-7, 2010, pp. 1-17, Orlando, Florida.
Project Page for xflr5, Accessed on Mar. 22, 2016, http://www.xflr5.com/xflr5.htm, Jan. 2016, pp. 1-4.
Moore, Mark D., "Concept of Operations for Highly Autonomous Electric Zip Aviation", 12th Aviation Technology, Integration and Operations (ATIO) Conference, Sep. 17-19, 2012, pp. 2012-5472, pp. 1-15, Indianapolis, Indiana.
Patterson, Michael D. and German, Brian J., "Performance Analysis and Design of On-Demand Electric Aircraft Concepts", 12th Aviation Technology, Integration and Operations (ATIO) Conference, Sep. 17-19, 2012, 2012-5474, pp. 1-28, Indianapolis, Indiana.
Smith, Jeremy C. and Viken, Jeffrey K., "Projected Demand and Potential Impacts to the National Airspace System of Autonomous, Electric, On-Demand Small Aircract", Sep. 17-19, 2012, pp. 1-21, Indianapolis, Indiana.
Miranda, Luis and Brennan, James E., "Aerodynamic Effects of Wingtip-Mounted Propellers and Turbines", AIAA 4th Applied Aerodynainics Conference, Jun. 9-11, 1986, AIAA Paper No. A86-37826, pp. 221-228, San Diego, California.
Goldschmied, F.R., "Jet Propulsion of Subsonic Bodies with Jet Total-Head Equal to Free Stream's", AIAA Applied Aerodynamics Conference, Jul. 13-15, 1983, AIAA Paper No. 83-1790, pp. 1-7, Danvers, Massachusetts.
Paulson, John W., "Wind Tunnel Investigation of a Fowler Flap and Spoiler for an Advanced General Aviation Wing", NASA Technical Note TN D-8236, Jun. 1976.
U.S. Appl. No. 14/121,001, filed Aug. 13, 2014, entitled "Vertical Take-Off and Landing Vehicle with Increased Cruise Efficiency".
Bradley, M. et al., "NASA N+3 Subsonic Ultra Green Aircraft Research SUGAR Final Review," Apr. 20, 2010, http://aviationweek.typepad.com/files/boeing_sugar_phase_i_final_review_v5.pdf.
Moore, Mark D. et al., "High-Speed Mobility Through On-Demand Aviation," AIAA Aviation Technology, Integration, and Operations Conference, Aug. 12-14, 2013, pp. 1-27, Los Angeles, CA.
Fredericks, William J. et al., "Benefits of Hybrid-Electric Propulsion to Achieve 4× Increase in Cruise Efficiency for a VTOL Aircraft," AIAA Aviation Technology, Integration, Operations Conference, Aug. 12-14, 2013, pp. 1-21, Los Angeles, CA.
Rothhaar, Paul M. et al., "NASA Langley Distributed Propulsion VTOL Tilt-Wing Aircraft Testing, Modeling, Simulation, Control, and Flight Test Development," 14th AIAA Aviation Technology, Integration, and Operations Conference, Jun. 16-20, 2014, pp. 1-14, Atlanta, Georgia.
Busan, Ronald C. et al., "Enabling Advanced Wind-Tunnel Research Methods Using the NASA Langley 12-Foot Low Speed Tunnel,"

(56) References Cited

OTHER PUBLICATIONS

14th AIAA Aviation Technology, Integration, and Operations Conference, Jun. 16-20, 2014, pp. 1-22, Atlanta, Georgia.
Moore, Mark D., "High Speed Mobility Through On-Demand Aviation," Presentation Slides, AIAA Aviation Technology, Integration, and Operations Conference, Aug. 12-14, 2013, pp. 1-34, Los Angeles, CA.
Fredericks, William, J. et al., "Project Reimar III Greased Lightning Overview," NASA Aeronautics Presentation Slides, Jan. 28, 2013, pp. 1-17.

* cited by examiner

TRI-ROTOR AIRCRAFT CAPABLE OF VERTICAL TAKEOFF AND LANDING AND TRANSITIONING TO FORWARD FLIGHT

CROSS-REFERENCE TO RELATED PATENT APPLICATIONS

This patent application is a continuation-in-part of, and claims the benefit of priority to, co-pending U.S. non-provisional patent application Ser. No. 14/121,001 entitled "Vertical Take-Off and Landing Vehicle with Increased Cruise Efficiency" filed Aug. 13, 2014, which claims the benefit of and priority to U.S. provisional patent application No. 61/865,347 entitled "Benefits of Hybrid-Electric Propulsion To Achieve 4× Increase In Cruise Efficiency for a VTOL Aircraft" filed on Aug. 13, 2013. This patent application also claims the benefit of priority to U.S. provisional patent application No. 62/137,634 entitled "Tri-Rotor Aircraft Capable of Vertical Takeoff and Landing and Transitioning to Forward Flight" filed Mar. 24, 2015. The entire contents of all three applications are hereby incorporated by reference in their entirety.

STATEMENT REGARDING FEDERALLY SPONSORED RESEARCH OR DEVELOPMENT

The invention described herein was made in part by employees of the United States Government and may be manufactured and used by or for the Government of the United States of America for governmental purposes without the payment of any royalties thereon or therefore.

BACKGROUND OF THE INVENTION

Vertical takeoff and landing ("VTOL") and cruise efficiency are diametrically opposed requirements for aircraft. There are system solutions today that require ground infrastructure, namely catapults and arresting equipment, to launch and recover cruise efficient aircraft, thereby imparting these aircraft with VTOL like capabilities. These current multi-part systems remove the need for the actual aircraft to perform VTOL, but the system as a whole (i.e., aircraft plus ground infrastructure) becomes a VTOL system. With these current systems it is not possible to meet both VTOL and cruise efficiency requirements without the use of ground infrastructure.

Fixed wing aircraft are faster and more fuel efficient than rotary winged aircraft, while rotary winged aircraft can hover and do not require long runways for takeoff and landing. Many potential missions make aircraft combining these features desirable, but current aircraft configurations that are capable of vertical takeoff and transitioning to horizontal flight, including tilt-rotors, tilt-wings, and tail-sitters usually result in significant compromises in the performance of the aircraft in both the VTOL and horizontal flight modes because of the competing requirements of VTOL and efficient forward flight capabilities. For example, tail-sitters have relatively poor stability at landing because the center of gravity is relatively high, and tail-sitters are limited to small aircraft because the tail structure must support the weight of the aircraft. Additionally, the fuselage of tail-sitters is vertical on the runway limiting the types of cargo that may be carried. Tilt-rotors and tilt-wings provide vertical takeoff and transition, but are complex designs that present challenges with packaging the mechanisms for tilting inside the aircraft wing.

BRIEF SUMMARY OF THE INVENTION

The systems, methods, and devices of the present invention combine an advanced vehicle configuration, such as an advanced aircraft configuration, with the infusion of electric propulsion, thereby enabling a four times increase in range and endurance while maintaining a full vertical takeoff and landing ("VTOL") and hover capability for the vehicle. In this manner, various embodiments may provide vehicles, such as aircraft, with both VTOL and cruise efficient capabilities that may meet VTOL and cruise efficiency requirements without the use of ground infrastructure. The various embodiments may provide a VTOL and cruise efficient vehicle, such as an aircraft, comprising a wing configured to tilt through a range of motion, a first series of electric motors coupled to the wing and each configured to drive an associated wing propeller, a tail configured to tilt through the range of motion, a second series of electric motors coupled to the tail and each configured to drive an associated tail propeller, and an electric propulsion system connected to the first series of electric motors and the second series of electric motors. In a further embodiment, the electric propulsion system may be a battery augmented series hybrid electric propulsion system comprising one or more internal combustion engines, one or more generators coupled to the one or more internal combustion engines and connected to the first series of electric motors and the second series of electric motors, and one or more batteries connected to the first series of electric motors and the second series of electric motors.

The systems, methods, and devices of the present invention provide a vehicle, such as an aircraft, with rotors configured to function as a tri-copter for VTOL and a fixed-wing vehicle for forward flight. In an embodiment, one rotor may be mounted at a front of the vehicle fuselage on a hinged structure controlled by an actuator to tilt from horizontal to vertical positions. In an additional embodiment, two additional rotors may be mounted on the horizontal surface of the vehicle tail structure with rotor axes oriented vertically (e.g., perpendicular) to the fuselage. In an embodiment, for forward flight of the vehicle, the front rotor may be rotated down such that the front rotor axis may be oriented horizontally (e.g., parallel) along the fuselage and the front rotor may act as a propeller, while the tail rotors may be deactivated. In an embodiment, for vertical flight, the front rotor may be rotated up such that the front rotor axis may be oriented vertically (e.g., perpendicular) to the fuselage, while the tail rotors may be activated.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 1:
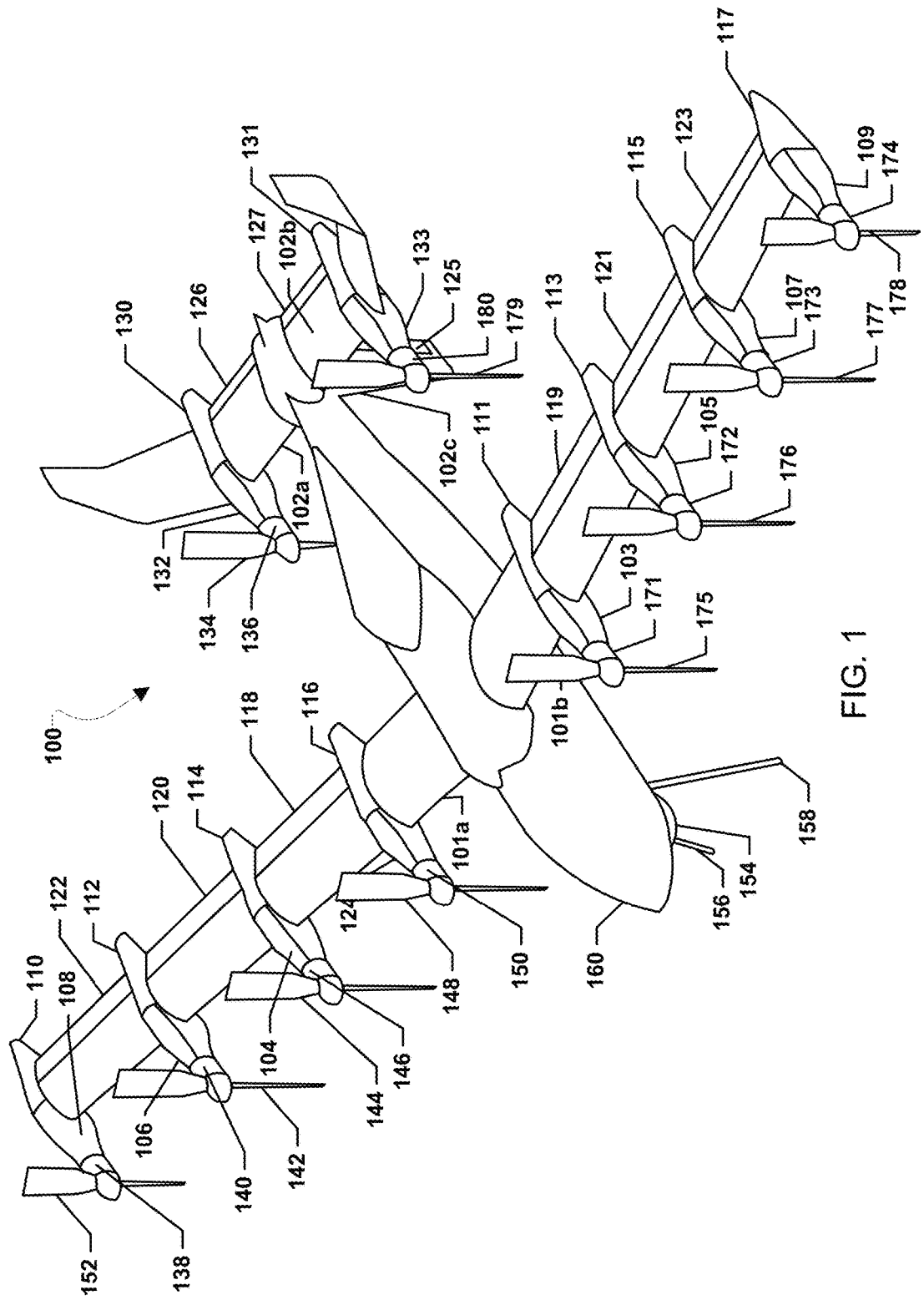
FIG. 1 is a component block diagram illustrating a front/left upper perspective view of an embodiment VTOL and cruise efficient aircraft.

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Electric propulsion may enable radical new vehicle concepts and configurations, particularly for vertical takeoff and landing ("VTOL") aircraft because electric propulsion may address the significant mismatch between takeoff and cruise power conditions experienced by VTOL aircraft. The ability to distribute the thrust across the airframe, without mechanical complexity and with a scale free propulsion system, may provide a new degree of freedom for aircraft designers.

The various embodiment vehicle configurations may combine an advanced vehicle configuration, such as an advanced aircraft configuration, with the infusion of electric propulsion, thereby enabling a four times increase in range and endurance while maintaining a full VTOL and hover capability (similar to the VTOL and hover capabilities of a helicopter) for the vehicle. In this manner, various embodiments may provide vehicles, such as aircraft, with both VTOL and cruise efficient capabilities that may meet VTOL and cruise efficiency requirements without the use of ground infrastructure. Cruise efficient vehicles, such as cruise efficient aircraft, may provide various efficiencies based on the vehicle mission, such as reduced energy consumption during flight, long range, and/or long endurance. The various embodiments may also provide the ability to achieve low disc-loading for low ground impingement velocities, low noise, and/or hover power reduction/minimization which may reduce energy consumption in a VTOL phase of flight.

The systems, methods, and devices of the various embodiments may provide a VTOL and cruise efficient vehicle, such as an aircraft, comprising a wing configured to tilt through a range of motion, a first series of electric motors coupled to the wing and each configured to drive an associated wing propeller, a tail configured to tilt through the range of motion, a second series of electric motors coupled to the tail and each configured to drive an associated tail propeller, and an electric propulsion system connected to the first series of electric motors and the second series of electric motors. In a further embodiment, the electric propulsion system may be a battery augmented series hybrid electric propulsion system comprising one or more internal combustion engines, one or more generators coupled to the one or more internal combustion engines and connected to the first series of electric motors and the second series of electric motors, and one or more batteries connected to the first series of electric motors and the second series of electric motors.

Electric propulsion may be scale-free in terms of being able to achieve highly similar levels of motor power to weight and efficiency across a dramatic scaling range. Using distributed electric propulsion may enable the various embodiment advanced aircraft configurations to achieve improvements in aerodynamic efficiency that may be approximately four times that of conventional helicopter configurations. Helicopters typically achieve a Lift to Drag ratio (L/D) of between 4 and 5, while the various embodiment VTOL aircraft may achieve an L/D of 15 to 20, such as 15, approximately 15, 15-17, 17-20, approximately 15 to approximately 20, approximately 20, etc. The various embodiments provide the ability to eliminate the problem of advancing and retreating rotor blades by converting into wing born flight without the mechanical complexity of previous VTOL aircraft.

The various embodiments may utilize hybrid electric propulsion to normalize the power across the mission phases and to enable the combustion engine to be sized for wing born flight and batteries may be used to supplement the power required in hover. This may yield an overall lighter propulsion system, which may make for a smaller aircraft, which may lead to lower cost.

In an embodiment, an aircraft may have one or more propellers, such as one, two, three, four, five, six, seven, eight, nine, ten, or more propellers, and one or more electric motors may distribute thrust across the propellers. For example, the electric motors may distribute thrust across ten propellers. In an embodiment, propellers may be mounted to the leading edge of the wing of the aircraft and mounted to the leading edge of the tail of the aircraft. The number of propellers mounted to the leading edge of the wing of the aircraft and the leading edge of the tail of the aircraft may vary. For example, in an embodiment in which the aircraft may have ten propellers, eight propellers may be mounted to the leading edge of the wing and two propellers may be mounted to the leading edge of the tail of the aircraft. In an embodiment, at least a portion of the wing of the aircraft and at least a portion of the tail of the aircraft may both tilt to transition the aircraft between hovering flight and wing born flight. In an embodiment, the wing of the aircraft and the tail of the aircraft may both rotate around the lateral axis of the wing and tail, respectively, to tilt the wing and tail through a range of motion, thereby pitching the wing and tail up and/or down relative to the longitudinal axis of the aircraft to transition the aircraft between hovering flight (i.e., the VTOL phase) and wing born flight (i.e., the wing born flight phase). The range of motion may be any range of motion, such as less than 90 degrees, 90 degrees, approximately 90 degrees, greater than 90 degrees, etc. The tilting portions of the wing of the aircraft and the tail of the aircraft may tilt together or independently and may tilt to the same or different orientations in their respective ranges of motion.

In an embodiment, an aircraft may include a semi-tandem wing configuration. The semi-tandem wing configuration may provide a compromise between a tandem wing configuration, which carries half the lift on the tail, and a conventional wing configuration, which carries no lift on the tail. The center of gravity of the embodiment aircraft with the semi-tandem wing configuration may be located aft of the wing. The embodiment semi-tandem wing configuration may cause some lift to be carried on the tail of the aircraft, which may allow the propellers on the tail to carry some the aircraft's weight during a hover in the VTOL flight phase. For example, the tail may carry less than fifty percent of the lift. However, the wing may carry most of the lift of aircraft. The embodiment semi-tandem wing configuration may enable the wing to be proportionally larger than the tail and achieve a greater span in order to reduce induced drag. In an embodiment, the aircraft may be designed such that the center of gravity location is selected to have the propellers on the wing carry a higher percent of the aircraft's weight than the propellers on the tail. In this manner, the propellers on the tail may provide greater pitch control authority and reduce induced drag of the tail by reducing the amount of lift that may be required to be carried on the tail. The embodiment semi-tandem wing configuration with a lifting tail may be statically stable in the wing born flight phase (i.e., forward flight). In an embodiment, the aircraft may be designed such that the lift coefficient, tail loading, and lift curve slope of the tail may be less than the lift coefficient, wing loading, and lift curve slope of the wing. In an embodiment, the aircraft may include a swept wing to shift the aerodynamic center of the wing aft in forward flight and still keep the center of thrust forward in hovering flight when the wing is rotate up 90 degrees. In an embodiment, the sweep of the wing may enable a reduction in the induced drag of the aircraft. During a hover, propeller thrust needs to be distributed about the center of gravity of the aircraft. Without a swept wing, in forward flight the wing stays in front of the center of gravity resulting in only about eighty percent of the lift on the wing and twenty percent on the tail. However, in an embodiment with a swept wing, in a hover, the propellers are forward of the wing, but in forward flight the wing center is farther aft enabling ninety two percent of the lift to be on the wing and eight percent to be on the tail. Since the swept wing has higher span (i.e., lower span loading), it is more efficient to carry lift on the wing.

In an embodiment, forward flight propellers may be located at the wing tips of the aircraft. The wing tip forward flight propellers may provide a destructive interference between the propeller swirl and the wing tip vortex. The resulting interference may be viewed as an induced drag reduction or a propulsive efficiency increase. In an embodiment, the forward flight propellers may run for the entire mission (i.e., both during the VTOL flight phase and the wing born flight phase). In an embodiment, the forward flight propellers may run only during the wing born flight phase. In an embodiment, the forward flight propellers may be variable speed (e.g., variable revolutions per minute ("RPM")) and/or variable pitch propellers. The use of variable speed and/or pitch propellers may maximize propulsive efficiency.

In an embodiment, vertical flight propellers may fold down during the wing born flight phase. In an embodiment, the vertical flight propellers may fold into conformal recesses of the motor pylons. The folding of the vertical flight propellers, especially into conformal recesses, may reduce drag in the wing born flight phase when compared to leaving the vertical flight propellers deployed. In an embodiment, the vertical flight props may extend aft of the leading edge of the wing and/or tail when folded. In an embodiment, to prevent the vertical flight propellers from contacting the leading edge of the wing as the vertical flight propellers are started, the vertical flight propeller blades may ride along a sinusoidal cam to push the blades forward enough to avoid contact with the leading edge of the wing and/or tail.

In an embodiment, the propellers may be synchronized electronically to hold a specific phase angle to provide destructive interference of each propeller's noise. This may result in a quieter aircraft as a whole relative to the sound generated by each propeller in isolation. In an embodiment, each successive propeller may rotate in an alternate direction to prevent the wake of one propeller blade impacting the wake of the adjoining propeller blade. In this manner, the wakes of the propellers may pass in the same direction as opposed to colliding head on.

In an embodiment, the aircraft may include reflexed flaperons. The use of reflexed flaperons may delay the onset of stall on the wing during transition between the VTOL flight phase and the wing born flight phase. As discussed herein, "flaperons" refers to any control surface used as both ailerons and flaps. By having reflexed (i.e., trailing edge up) flap deflections, the reflexed flaperons reduce the circulation around the airfoil allowing the airfoil to go to a higher angle of attack before airflow separates.

In an embodiment, when the tail is tilted vertically in the VTOL flight phase, the vertical tail may serve a second role as a rear landing skid. In an embodiment, the wing tip motor pylons may serve as outboard landing skids, thereby giving the aircraft a wide stance on the ground to reduce tip over risk at landing.

In an embodiment, a dihedral may be configured in the outboard portion of the horizontal tail to provide directional stability during the slow speed portion of the transition corridor between the VTOL flight phase and the wing born flight phase.

In an embodiment, an aircraft may utilize a battery augmented series hybrid electric propulsion system. This use of a battery augmented series hybrid electric propulsion system may reduce propulsion system weight and enable unconventional configurations. In an embodiment, all propellers may be turned by electric motors. In an embodiment, electrical power to operate each motor may be provided from one or both of two sources. A first source may be a primary electrical source comprised of generators driven by internal combustion engines. A second electrical source may be battery packs. In an embodiment, the internal combustion engines may be sized to meet the power requirements during the wing born flight phase, but the power required in the VTOL flight phase and during transition may be greater than the power required in the wing born flight phase. The battery packs may be sized to make up for the difference between the power required in the VTOL flight phase and during transition and the power the internal combustion engines may provided by turning the alternators. This embodiment configuration may support the minimum propulsion system weight (as opposed to sizing the internal combustion engines for power required for VTOL flight) for missions where the time spent in hover may be a small percent of the time spent in wing born flight. The embodiment series hybrid propulsion system may effectively act as an "electric driveshaft" and an "electric gearbox" eliminating the driveshafts and gear boxes necessary to distribute power to each propeller in previous aircraft by filling the same function. In an embodiment, in hovering flight the internal combustion engines may turn generators, and the electrical power from the generators may be fed to a controller that outputs uniform direct current ("DC") power. The DC power may be distributed via wires throughout the aircraft. The DC power may be provided to a motor controller associated with each motor which may convert the DC power to alternating current ("AC") power to drive the AC motors turning the propellers. The advantage of converting the AC output of the generators to DC power and the converting the DC power to AC power at each motor may be that the motor controller for each motor may independently drive its associated motor allowing the RPM to be varied on a per motor basis. The use of two controllers may result in some power loss due to the inefficiency of the controllers. In an embodiment, in wing born flight the internal combustion engines may turn the generators and the AC power output by the generators may be provided via wires directly to the motors without using intermediate controllers, thereby operating the generators and motors in a synchronous mode. This may avoid controller loss. The RPM of the generator may need to be equal to the RPM of the motor being driven or if the pole count of the generator is different than the pole count of the motor, the ration of the motor to generator RPM may be the ratio of the motor to the generator pole count.

In an embodiment, the use of electric motors to drive the propellers may provide an aircraft with a propulsion system that has no single point of failure. The use of multiple electric motors may enable the failure of one motor to occur and the aircraft to still fly. Because electric motors may put out more power by turning at a higher RPM, in the event of a motor failure, other propellers, as required, may be turned at a higher RPM by their respective motors ensuring the aircraft may still be flyable. The increase of RPM may put out more thrust per remaining propeller (meaning also more noise), but the aircraft may remain flyable.

In an embodiment, the propellers of the aircraft may turn at a low tip speed, enabling the aircraft to achieve a very low noise profile.

The various embodiments may provide a vehicle, such as an aircraft, with rotors configured to function as a tri-copter for VTOL and a fixed-wing vehicle for forward flight. In an embodiment, one rotor may be mounted at a front of the vehicle fuselage on a hinged structure controlled by an actuator to tilt from horizontal to vertical positions. In an additional embodiment, two additional rotors may be mounted on the horizontal surface of the vehicle tail structure with rotor axes oriented vertically (e.g., perpendicular) to the fuselage.

In an embodiment, for forward flight of the vehicle, the front rotor may be rotated down such that the front rotor axis may be oriented horizontally (e.g., parallel) along the fuselage and the front rotor may act as a propeller, while the tail rotors may be deactivated. For example, when the tail rotors are deactivated the tail rotors may be stowed in pods, allowed to weathervane, oriented such that the long axis is aligned with the air flow (e.g., via the use of the motor magnets, external magnets, or other fixtures), or otherwise operate in an unpowered mode. During forward flight control surfaces, such as ailerons, rudders, elevators, etc., may control the vehicle movement and/or orientation.

In an embodiment, for vertical flight, the front rotor may be rotated up such that the front rotor axis may be oriented vertically (e.g., perpendicular) to the fuselage, while the tail rotors may be activated. The elevators on the tail may be rotated down, such as close to vertical, to reduce or prevent obstruction of the air flow from the tail rotors. The elevators on the tail may be independently deflecting elevators. Differential thrust may be produced by varying the speed or blade pitch (e.g., collectively and/or independently) of the three rotors (i.e., the front rotor and two tail rotors), and the thrust produced by the three rotors may enable vertical motion of the vehicle, as well as pitch, roll, and/or horizontal motion. Yaw may be controlled by differentially actuating the left and right elevators to move them toward or away from the vertical position, by actively tilting the tail rotors side to side, and/or actively tilting the tail rotors forward and aft to provide yaw torque. Yaw torque may also be achieved by mounting the tail rotors with an outward cant angle.

In an embodiment, during transition from vertical flight to forward flight, the front rotor angle may be changed as the front rotor is rotated from a position the where the front rotor axis may be oriented vertically (e.g., perpendicular) to the fuselage down to a position where the front rotor axis may be oriented horizontally (e.g., parallel) along the fuselage, and the front rotor speed, tail rotor speeds, and/or elevator collective angles may be adjusted to maintain altitude and pitch stability while the vehicle accelerates forward.

The various embodiment tri-rotor design vehicles may enable a larger front rotor than may be used on conventional fixed front propeller aircraft because the front rotor may rotate parallel to the ground during take-off and landing. In this manner, the larger diameter rotor may provide an advantage of noise reduction for the various embodiment tri-rotor design vehicles compared to conventional fixed front propeller aircraft.

Cyclic pitch control may not be required on any of the rotors, but may be added to/used with any of the rotors to provide control torques. The various embodiment tri-rotor design vehicles may provide simpler hovering and transitioning vehicle designs by providing only a single mechanism for tilting a propeller, requiring fewer mechanisms than tilt-rotor or tilt-wing designs. Additionally, cyclic pitch control may not be required. The various embodiment tri-rotor design vehicles may keep the vehicle fuselage horizontal during forward flight and vertical flight, thereby allowing an unobstructed field of view for cameras and other sensors, as well as a constant orientation for a communications antenna. As compared to a tail-sitter design, the various embodiment tri-rotor design vehicles with horizontal fuselage during VTOL mode may enable better vehicle stability at landing due to the lower center of gravity, vertical g-load on the payload at all time which may be advantageous for human pilots and passengers, closer payload position to the ground after landing, and/or better scalability resulting from lower tail structural loads. Additionally, the VTOL configuration may reduce ground support requirements, for example, by eliminating the need for catapult launchers, reducing runway length, and/or eliminating the need for a landing recovery system.

The various embodiment tri-rotor design vehicles may be suitable for use in missions requiring hover capabilities, such as photography of a remote site, which may also benefit from added range, as well as missions involving taking off without an airport or runway, including private or roadable aircraft application, bush aircraft, etc. Additionally, the various embodiment tri-rotor design vehicles may be suitable for autonomous (unmanned) missions to place payloads at extreme distances from a launch and recover site.

Unique wind tunnel testing that combines a nested face-centered design of experiments ("DOE") with optimal design points to achieve testing efficiency and statistically sound mathematical models was developed. This methodology required new tools and specialized tunnel software to execute the experiment, such as allowing randomized set points, as well as substantial automation of both the wind tunnel model and test facility. The new methodology reduced testing time by over sixty years.

The applications for the various embodiment aircraft that may take off and land vertically and yet fly for a long duration and range are numerous. Applications may range from military reconnaissance missions, to police and fire department surveillance roles, to civilian automated door to door package delivery (e.g., mail, prescription drugs, food, etc.), to air taxi services.

FIGS. 1-7 illustrate various views of an embodiment VTOL and cruise efficient vehicle, such as aircraft 100. FIG. 1 is a component block diagram illustrating the front/left upper perspective view of the embodiment aircraft 100 with the wing (comprised of wing sections 101a and 101b) and horizontal tail sections 102a and 102b (comprising the tilting portions of the overall tail comprised of tiltable horizontal tail sections 102a and 102b and vertical tail section 102c which remains fixed) in the wing born flight phase configuration (i.e., tilted down parallel to the longitudinal axis of the fuselage 160). In an embodiment, the aircraft 100 may include four engine nacelles on each wing section 102a and 102b and one engine nacelle on each tail horizontal tail section 102a and 102b. The engine nacelles may be comprised of pairings of pylons 103, 104, 105, 106, 107, 108, 109, 124, 132, and 133 and respective fairings 111, 114, 113, 112, 115, 110, 117, 116, 130, and 131. In an embodiment, each of the pylons 103, 104, 105, 106, 107, 108, 109, 124, 132, and 133 may have the same outside mold line ("OML") while each of the fairings 110, 111, 112, 113, 114, 115, 116, 117, 130, and 131 may have its own OML. Electric motors may be coupled to each pylon 103, 104, 105, 106, 107, 108, 109, 124, 132, and 133 to drive a propeller associated with each nacelle. Pylons 108, 106, 104, 124, 132, 103, 105, 107, 109, and 133 are illustrated with their respective electric motors 138, 140, 146, 150, 136, 171, 172, 173, 174, and 180 as well as their respective propellers 152, 142, 144, 148, 134, 175, 176, 177, 178, and 179. In an embodiment, propellers 152, 134, 178, and 179 may be variable pitch propellers and propellers 142, 144, 148, 175, 176, and 177 may be fixed pitch propellers. In an embodiment, propellers 142, 144, 148, 175, 176, and 177 may fold down when not in use, such as during wing born flight. Propellers 152, 134, 142, 144, 148, 178, 179, 175, 176, and 177 may have any number of blades, such as two blades, three blades, etc. In an embodiment, the aircraft 100 may include flaperons 118, 119, 120, 121, 122, and 123 on the wing and flaperons 126 and 127 on the tail. The flaperons 118, 119, 120, 121, 122, and 123 may be disposed on the trailing edge of the wing between successive nacelles. The flaperons 126 and 127 may be disposed on the trailing edge of the tail inboard of the tail mounted nacelles. The aircraft 100 may also include a vertical control surface on the vertical tail section 102c, such as a rudder 125. The aircraft 100 may include a camera 154 extending from the fuselage 160. In an embodiment, the aircraft 100 may include landing gear, such as retractable nose skids 156 and 158.

Figure 2:
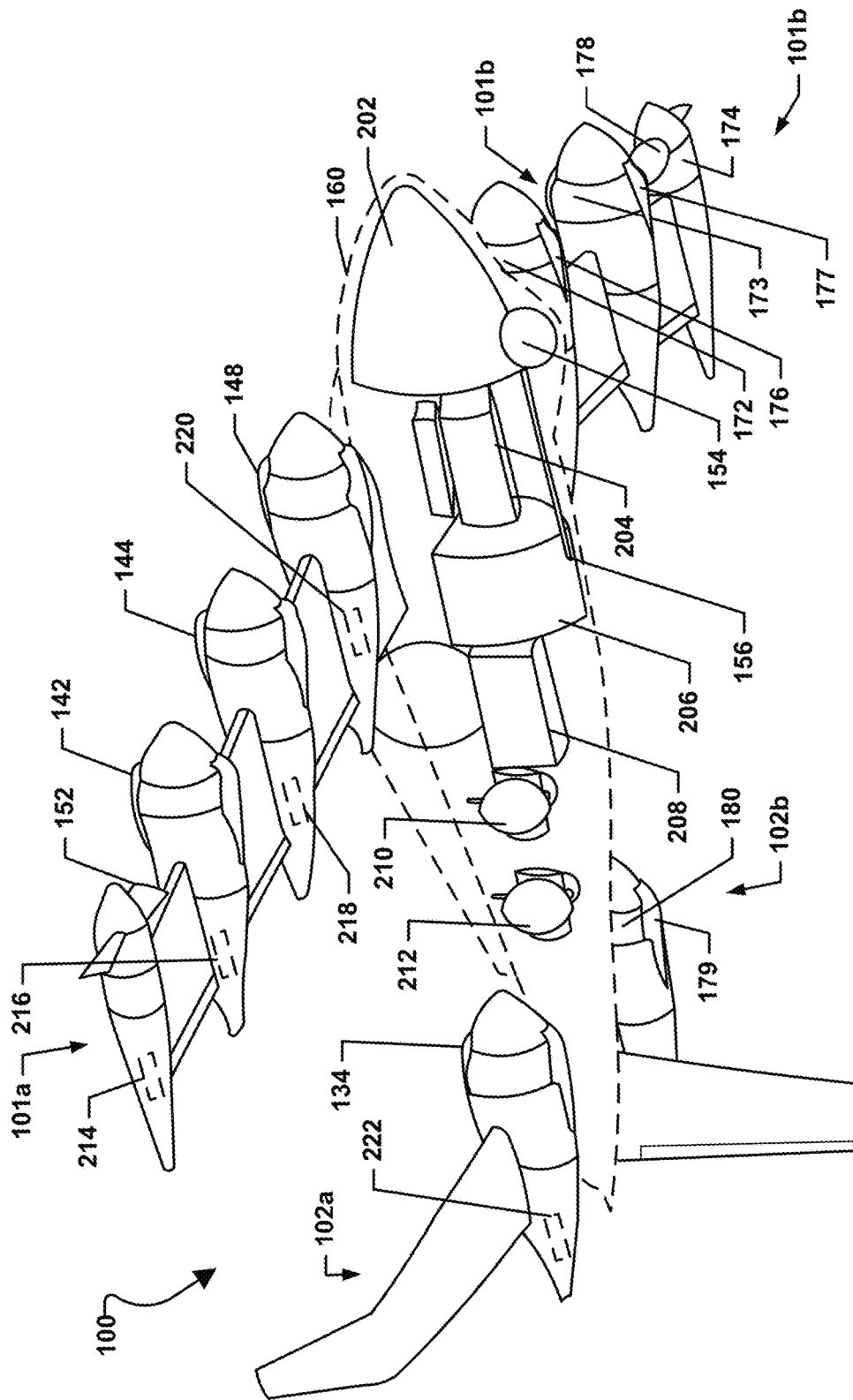
FIG. 2 is a component block diagram illustrating a front/right lower perspective view of the embodiment VTOL and cruise efficient aircraft.
Figure 3:
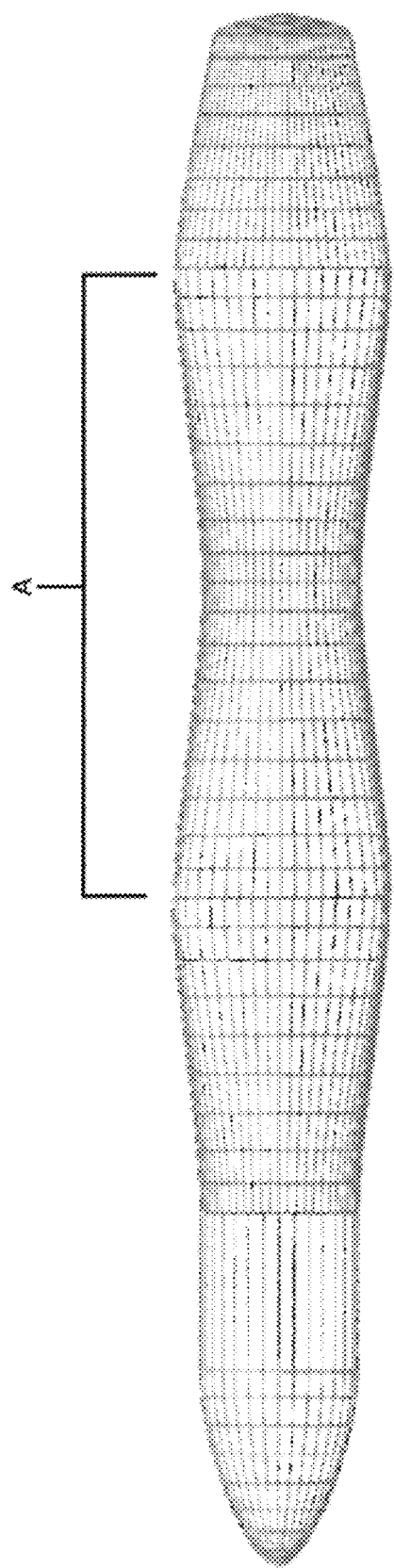
FIG. 3 is a top view of an embodiment of a pylon for the present invention.

FIG. 2 is a component block diagram illustrating a front/right lower perspective view of the embodiment VTOL and cruise efficient aircraft 100 shown with a cutaway view of the fuselage 160. In FIG. 2 the aircraft 100 may be configured for the wing born flight phase with propellers 142, 144, 148, 176, 177, 134, and 179 folded back against their respective pylons. In an embodiment, two primary power sources 210 and 212 may be comprised of internal combustion engines, such as two eight horse power diesel engines, coupled to two generators. The fuselage 160 may include a fuel tank 206 storing fuel for the primary power sources 210 and 212. The primary power sources 210 and 212 may be connected via wires and various controllers (not shown) to each of the electric motors and may provide power to drive the propellers. In an embodiment, batteries may be housed in each nacelle, such as batteries 214, 216, 218, 220, and 222 and their mirrored counterparts on the opposite side wing section 101b and horizontal tail section 102b. These batteries may also be connected to the electric motors via wires and various controllers (not shown) and may provide power to drive the propellers. Together the primary power sources 210 and 212 and various batteries may comprise a battery augmented series hybrid electric propulsion system for the aircraft 100. The aircraft 100 may include a satellite communication system comprised of various modules 204 and 208, and the aircraft may carry a payload 202. As illustrated in FIG. 2, the skids 156 and 158 may retract up to the fuselage 160 during wing born flight.

In an embodiment, the airfoil may be a custom designed shape to be a tradeoff between low drag at high lift coefficients, ease of wing fabrication, and gradual stall characteristics. In an embodiment, motor pylons may be shaped to minimize drag at high lift coefficients. Normally, when mounting pylons or nacelles at the leading edges of the wings, the pylons or nacelles mature the boundary layer and cause the airflow over the wing to separate early leading to a loss of lift and an increase in drag. In an embodiment, the area of the cross section of the pylons may vary from forward to aft. As an example shown in FIG. 3, the pylons of the various embodiments may have a bottle-type configuration (or shape) where the cross sectional area may be comparatively less in the middle portion A of the pylon than in a forward or aft section of the pylon which may minimize the super velocity around the pylon, thus reducing the drag between the wing and the pylon. The bottle configuration (or shape) of the pylons may reduce the drag due to interaction with the wing. The airflow must accelerate to move around the thick regions, and it may be desirable to not have the thick region of the wing in the same place as the thick region of the pylons. The bottle configuration (or shape) may enable the thick regions of the pylon to be moved away from the thick region of the wing. When the wing has its proverse pressure gradient, the pylons may be shaped to have an adverse pressure gradient and when the wing has its adverse pressure gradient, the pylons may be shaped to have a proverse pressure gradient.

Figure 4:
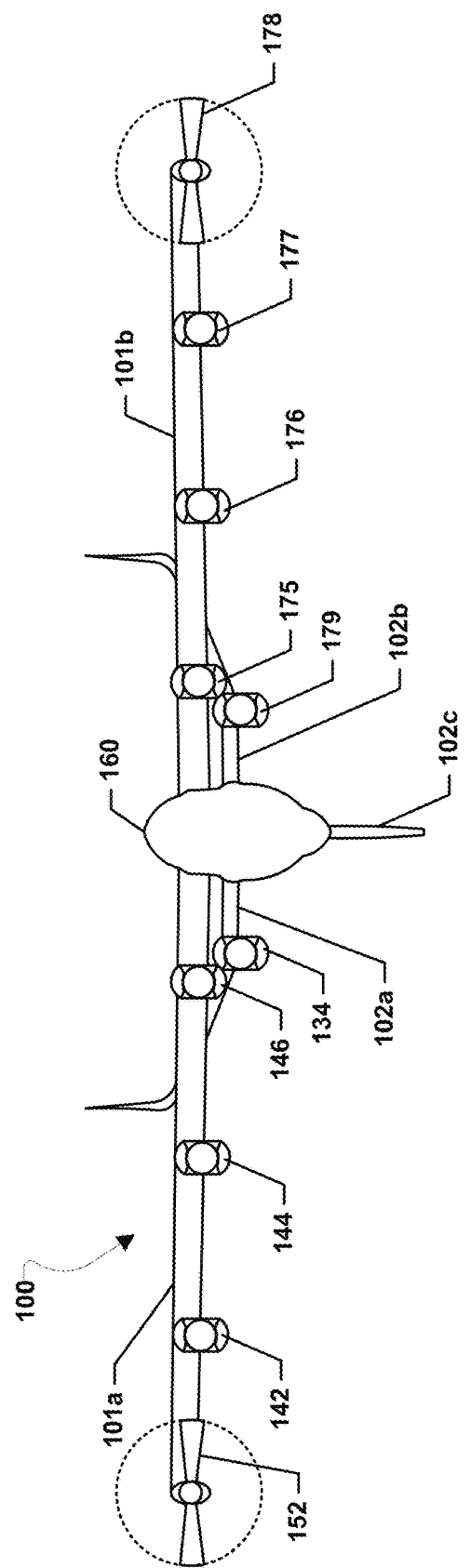
FIG. 4 is a component block diagram illustrating a front view of the embodiment VTOL and cruise efficient aircraft.

FIG. 4 is a component block diagram illustrating a front view of the embodiment VTOL and cruise efficient aircraft 100 in the wing born flight phase. In an embodiment, during wing born flight, the propellers 142, 144, 146, 134, 177, 176, 175, and 179 may fold down and only the propellers 152 and 178 may operate.

Figure 5:
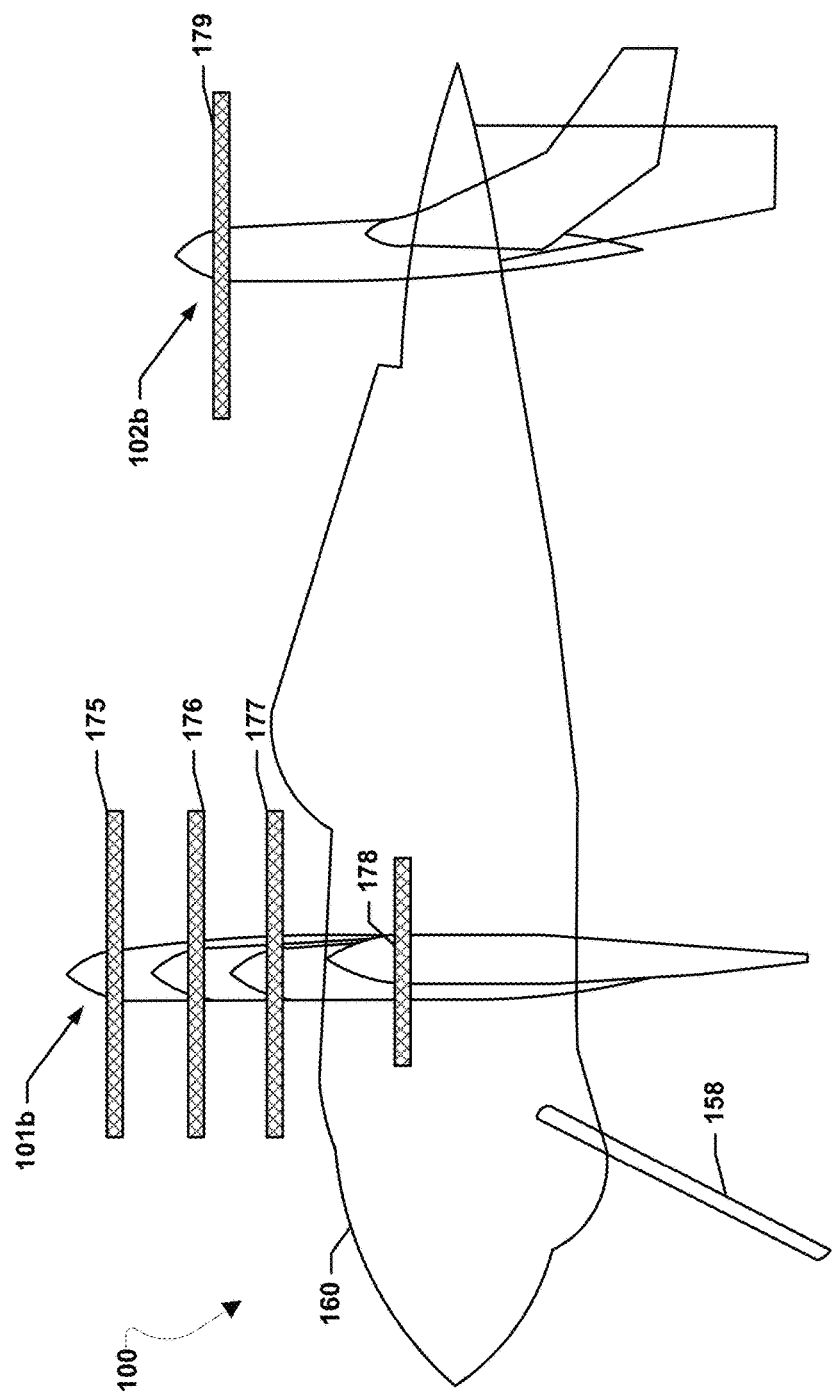
FIG. 5 is a component block diagram illustrating a left side view of the embodiment VTOL and cruise efficient aircraft in a VTOL flight phase.

FIG. 5 is a component block diagram illustrating a left side view of the embodiment VTOL and cruise efficient aircraft 100 in a VTOL flight phase. In the VTOL flight phase the wing and horizontal tail sections may be tilted up, such as to 90 degrees. In an embodiment, the propellers 175, 176, 177, 178, and 179 (and their right side counterparts), may all be driven by their respective motors in the VTOL flight phase. In another embodiment, the propellers 175, 176, 177, and 179 (and their right side counterparts) may be driven by their respective motors in the VTOL flight phase, while propeller 178 (and its right side counterpart) may not be driven by their respective motors. In an embodiment, the skids 156 and 158 and vertical tail surface 102c may be configured to support the aircraft 100 on the ground and the outboard wing nacelles may be configured to act as outboard landing skids. During VTOL flight, pitch may be controlled by the fore and/or aft propeller thrust modulation, roll may be controlled by left and/or right propeller thrust modulation, and yaw may be controlled by counter clock wise and clock wise rotation of the various propellers and the flaperons. In an embodiment, yaw may also be controlled by differential deflection of the flaperons.

Figure 6:
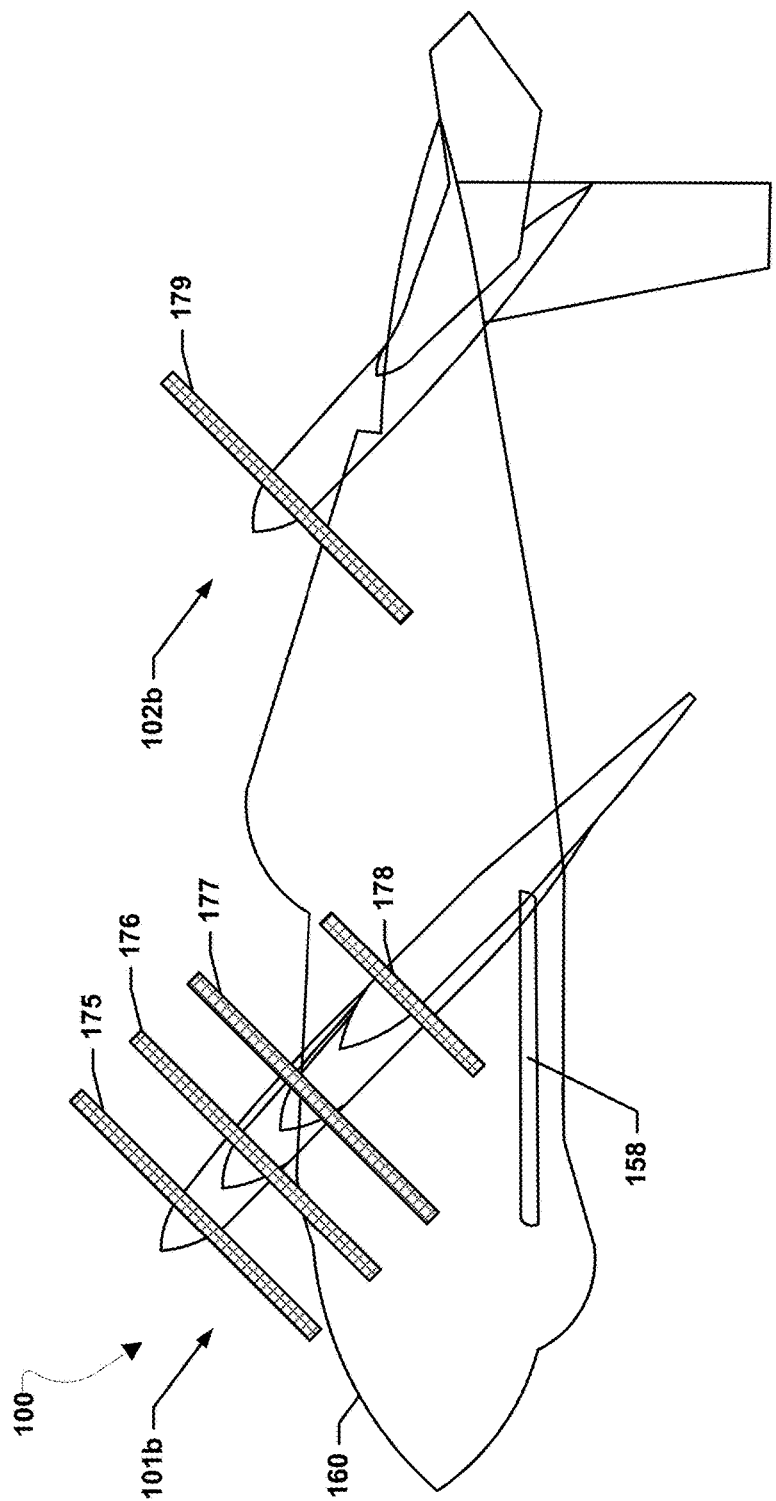
FIG. 6 is a component block diagram illustrating a left side view of the embodiment VTOL and cruise efficient aircraft transitioning between the VTOL flight phase and a wing born flight phase.

FIG. 6 is a component block diagram illustrating a left side view of the embodiment VTOL and cruise efficient aircraft 100 transitioning between the VTOL flight phase and a wing born flight phase. During the transition between VTOL flight and wing born flight the wing and horizontal tail surfaces may tilt (for example tilt down to transition from VTOL flight to wing born flight and tilt up to transition from wing born flight to VTOL flight). In an embodiment, the propellers 175, 176, 177, 178, and 179 (and their right side counterparts), may all be driven by their respective motors in the transition phase. In another embodiment, less than all the propellers may be driven during the transition. Additionally, the landing skids 156 and 158 may retract.

Figure 7:
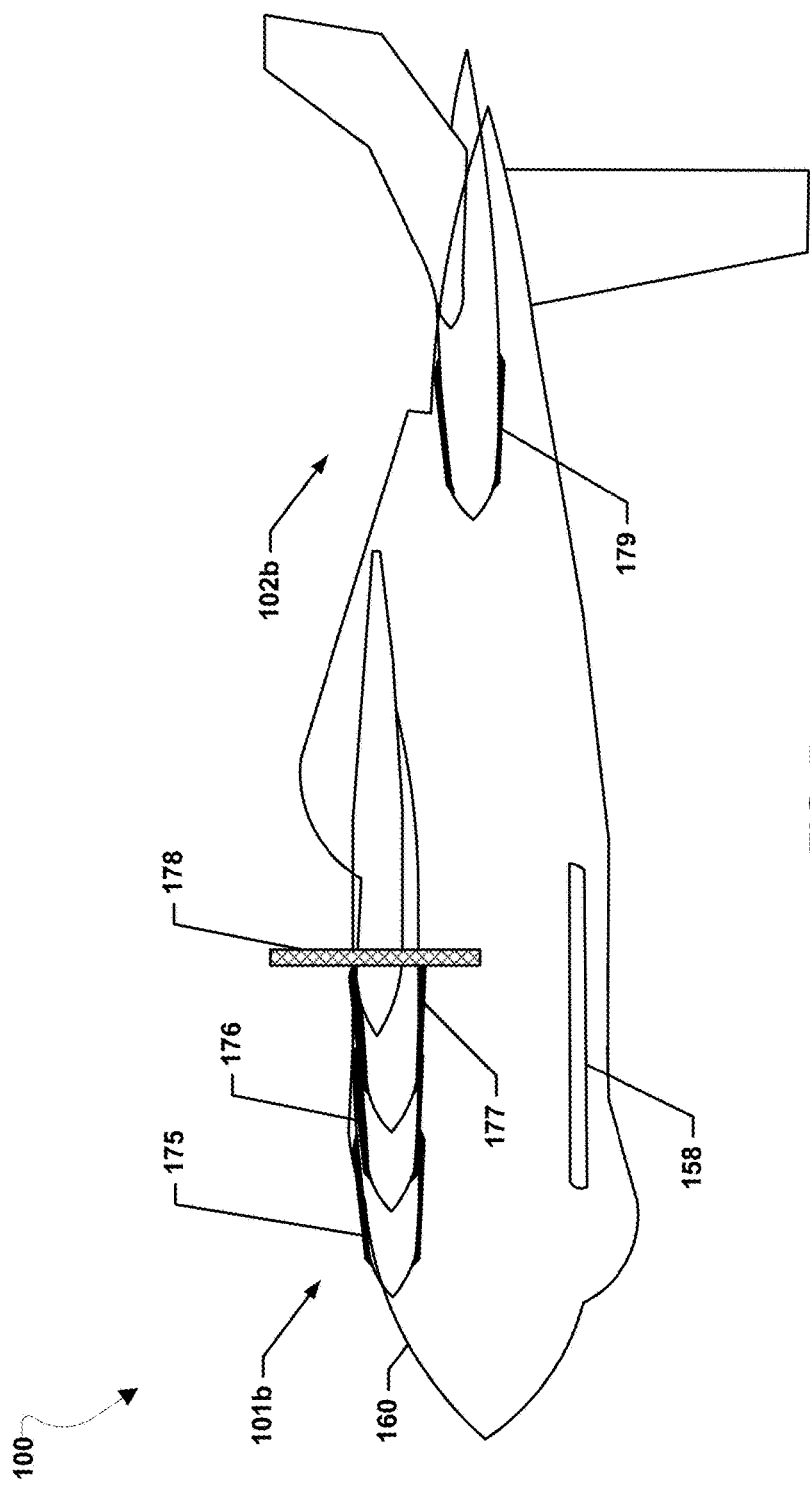
FIG. 7 is a component block diagram illustrating a left side view of the embodiment VTOL and cruise efficient aircraft in the wing born flight phase.

FIG. 7 is a component block diagram illustrating a left side view of the embodiment VTOL and cruise efficient aircraft 100 in the wing born flight phase. The wing and horizontal tail sections may be tilted down and the propellers 175, 176, 177, and 179 (and their right side counterparts) may be stopped and folded back wing born flight phase, while propeller 178 (and its right side counterpart) may be driven by their respective motors to provide the necessary propulsion for wing born flight. During wing born flight, pitch may be controlled by elevators for quick changes and/or by tail rotation for slow rotation, roll may be controlled by the flaperons, and yaw may be controlled by the rudder.

In an embodiment, the aircraft 100 may be an unmanned aerial vehicle, sized to for ease of vehicular roadway transportation. For example, the aircraft 100 may have a tow weight of less than or equal to two hundred and fifty pounds and may break down into no more than three storage boxes. Aircraft 100 may have a set up and launch time of less than sixty minutes by two trained operators, including off load, assembly, fueling, system checks, and start up. The operators may locally direct takeoff of the aircraft 100 then transfer control to a remote location via satellite data link. During recovery the operators may receive control locally to direct the landing, and landing and vehicle breakdown may take less than thirty minutes for two trained operators, including shut down, drainage of fuel, disassemble, and loading of the aircraft 100.

In an embodiment, a payload of the aircraft 100 may be a science payload of twenty-five pounds, requiring five hundred watts of power, and having a volume of 2500 cubic inches. The aircraft 100 may also carry a communications payload of thirty five pounds and requiring two hundred and seventy watts of power. In an embodiment, the aircraft 100 may have a small launch/recovery footprint defined by a twenty foot by twenty foot box. The aircraft 100 may provide landing accuracy and sensor placement within 1.5 meters of an intended location. The aircraft 100 may provide for loiter missions and/or sensor placement missions. In an embodiment, the aircraft 100 may be able to fly only on the secondary power source of the electricity from the batteries during wing born flight for short periods of time in order to fly quietly. In an embodiment, the aircraft may be able to climb to 100 feet before transitioning to wing born flight.

Figure 8:
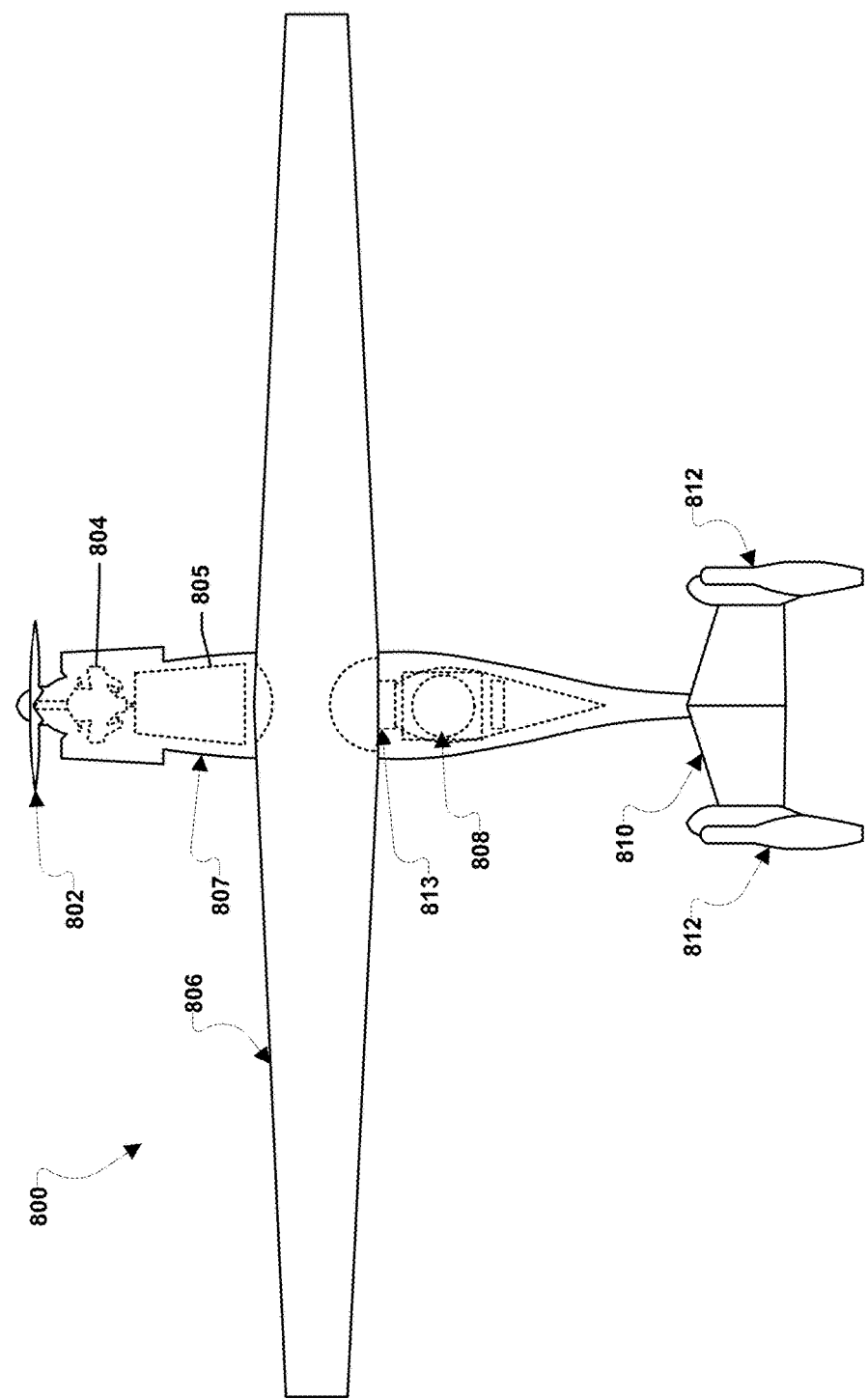
FIG. 8 is a component block diagram illustrating a top view of an embodiment tri-rotor vehicle.

FIGS. 8-14 illustrate various views of an embodiment tri-rotor vehicle, such as tri-rotor aircraft 800. FIG. 8 is a component block diagram illustrating a top view of an embodiment tri-rotor aircraft 800 including a front rotor 802 and two tail rotors 812. The tri-rotor aircraft 800 may include a fixed wing 806, fuselage 807, and tail 810. The fixed wing 806 may include ailerons for controlling roll. The front rotor 802 may be mounted at the front of the fuselage 807 on a hinged portion of the fuselage 807 that may house the motor 804 driving the front rotor 802. The motor 804 may be a fuel burning motor, such as a Cosworth engine, or an electric engine. The two tail rotors 812 may be mounted on the tail 810. In addition to the engine 804, the fuselage 807 of the tri-rotor aircraft 800 may house may include a payload 805, satellite communication system 808, fuel tank 813 for the engine 804, and camera turret 814 (shown in FIG. 9A).

Figure 9A:
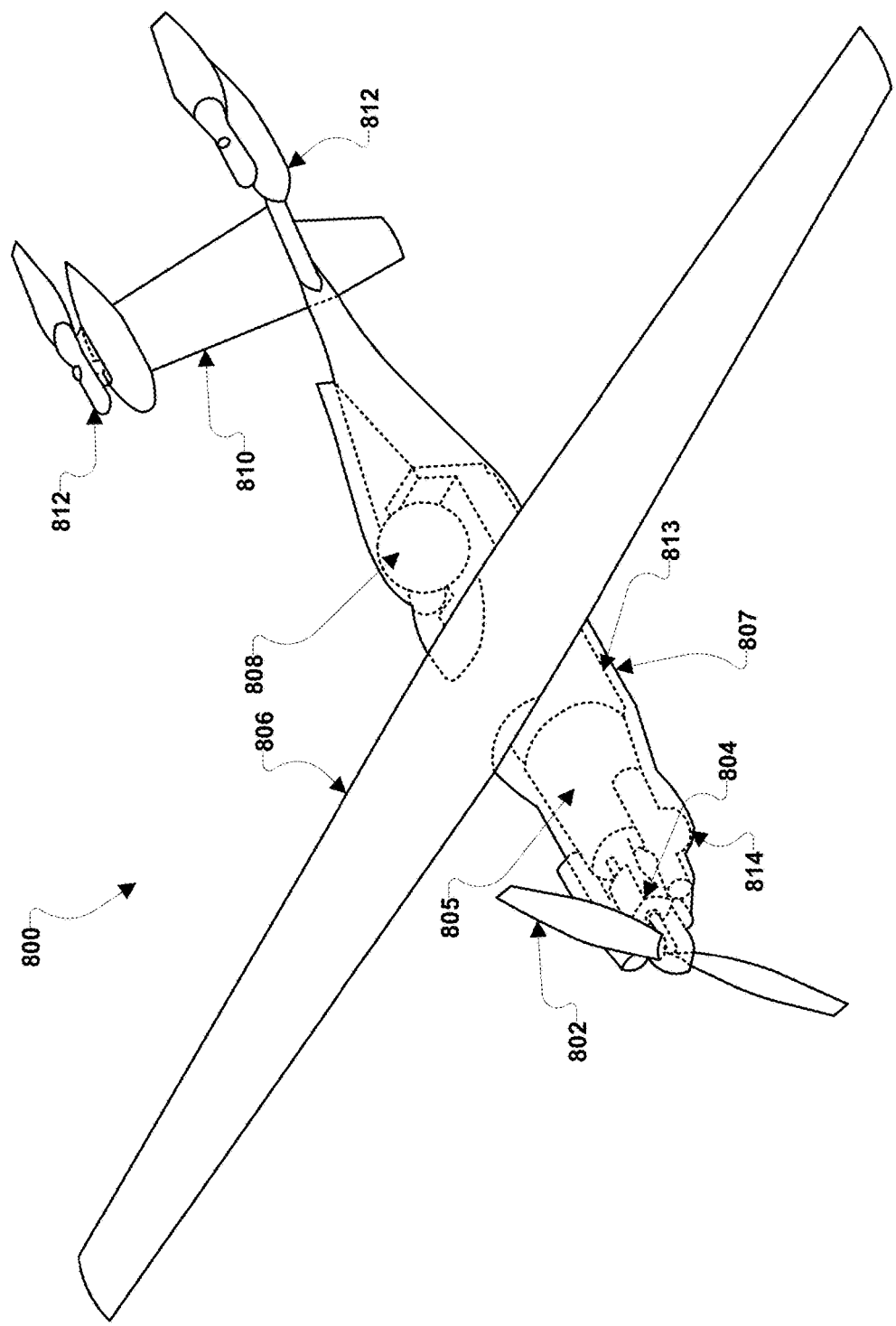
FIG. 9A is a component block diagram illustrating a front/left upper perspective view of the embodiment tri-rotor vehicle.
Figure 9B:
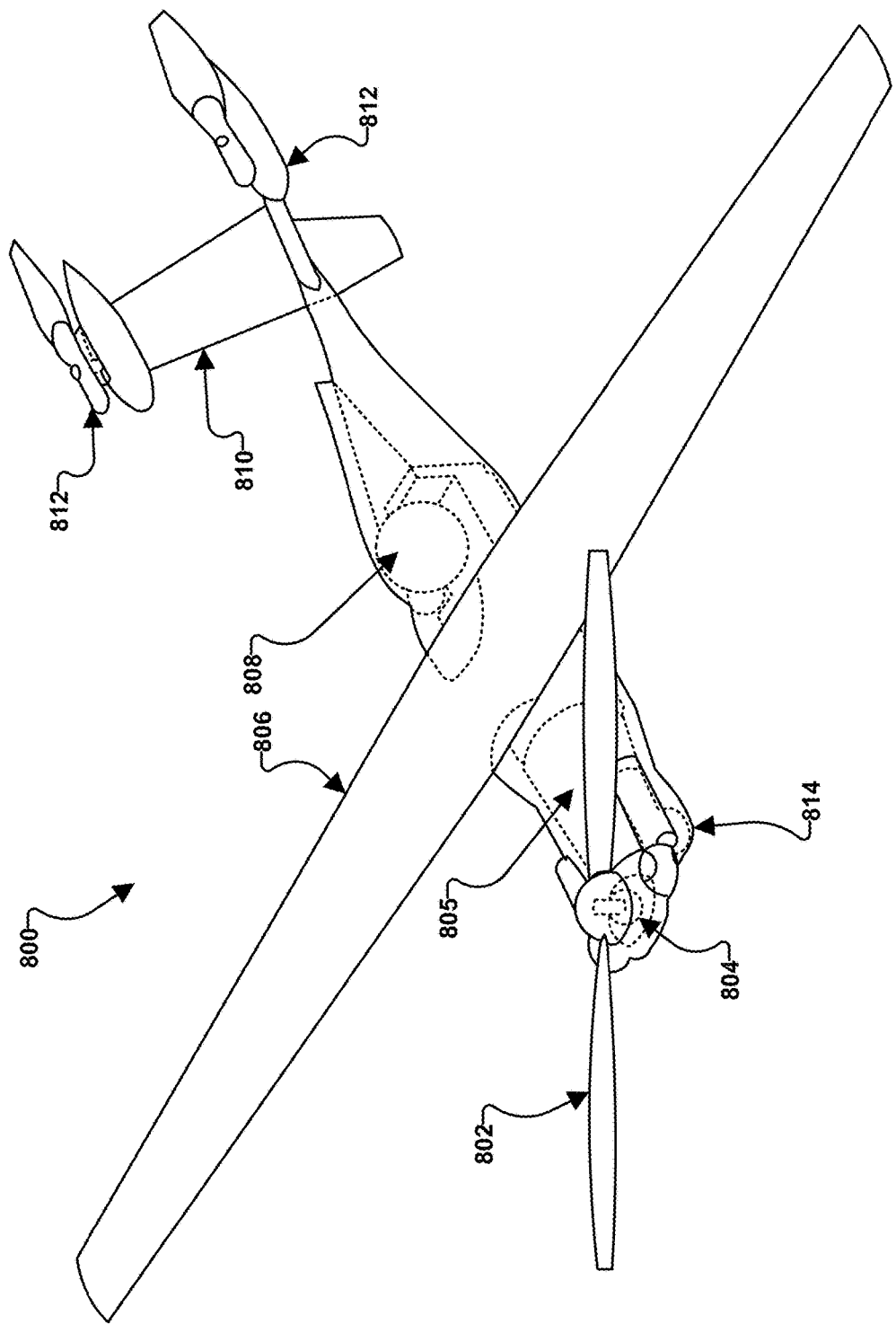
FIG. 9B is a component block diagram illustrating a front/left upper perspective view of the embodiment tri-rotor vehicle in a VTOL flight phase.

FIG. 9A is a component block diagram illustrating a front/left upper perspective view of the tri-rotor aircraft 800 in the wing born flight configuration phase, and FIG. 9B is a front/left upper perspective view of the tri-rotor aircraft 800 in a VTOL flight configuration or phase. As illustrated in FIG. 9A, during the wing born flight phase the front rotor 802 may be tilted down, and as illustrated in FIG. 9B, during the VTOL flight phase the front rotor 802 may be tilted up.

Figure 10:
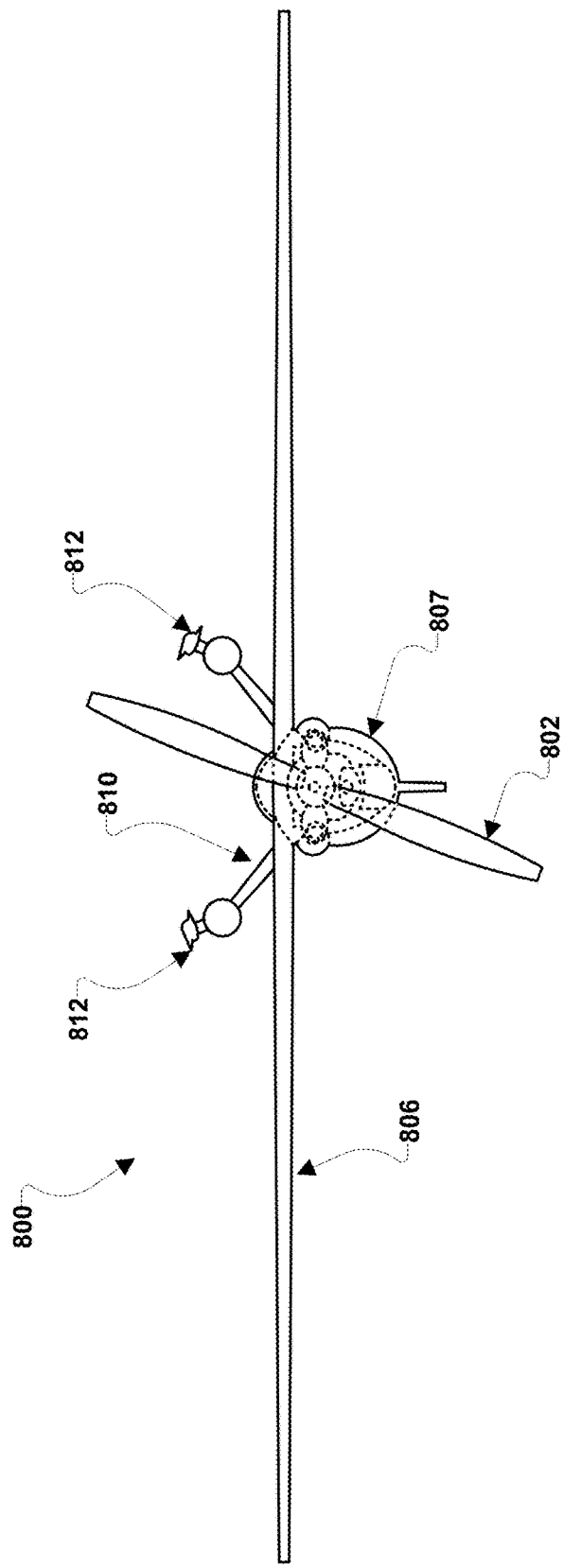
FIG. 10 is a component block diagram illustrating a front view of the embodiment tri-rotor vehicle.

FIG. 10 is a component block diagram illustrating a front view of the tri-rotor aircraft 800. As illustrated in FIG. 10, the tail 810 may be a v-tail structure with a vertical tail extending down from the v-tail surfaces. The vertical section of the tail extending down from the v-tail surfaces may include a rudder for controlling yaw.

Figure 11:
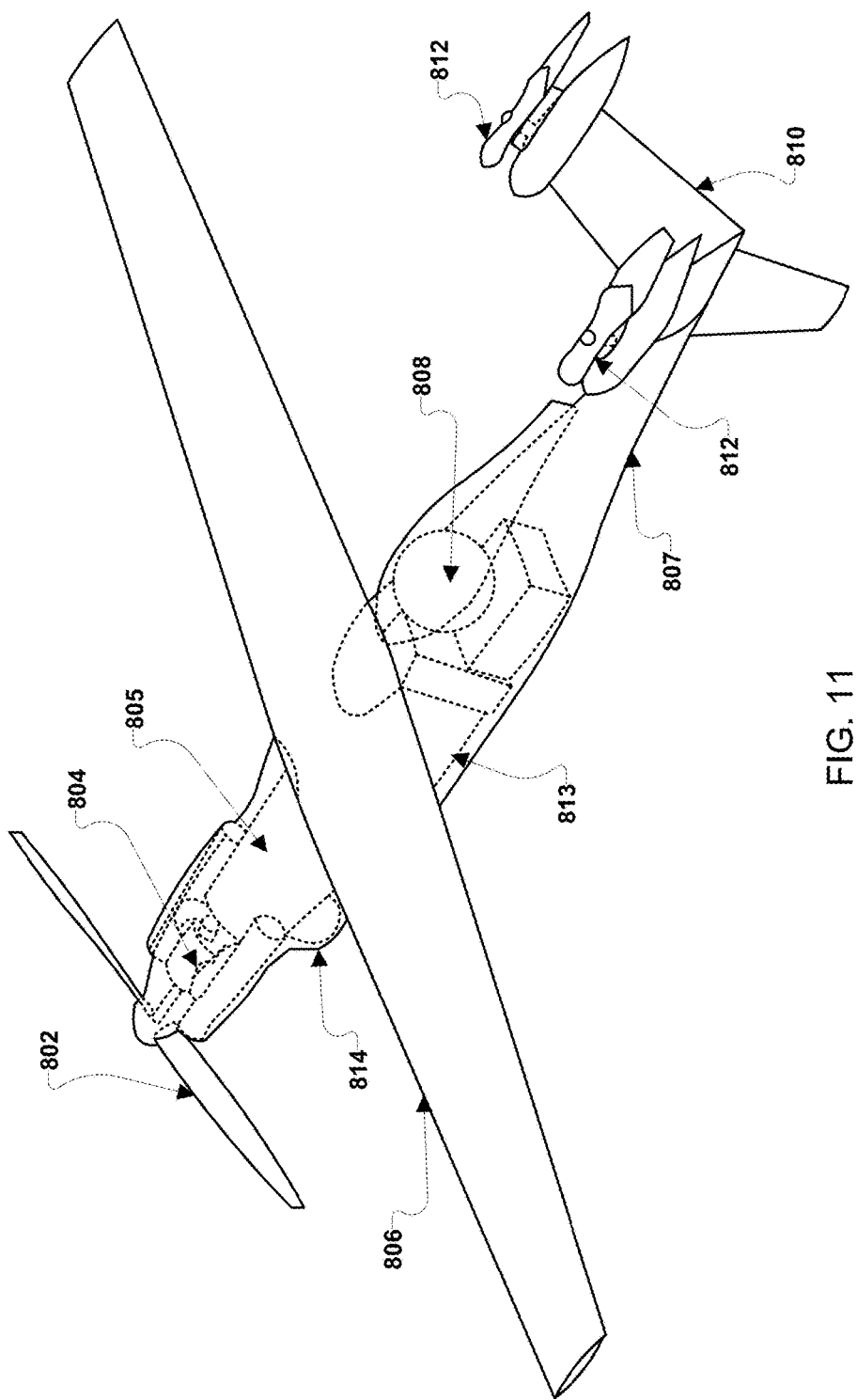
FIG. 11 is a component block diagram illustrating a rear/left upper perspective view of the embodiment tri-rotor vehicle.

FIG. 11 is a component block diagram illustrating a rear/left upper perspective view of the tri-rotor aircraft 800. The tail rotors 812 may be mounted on pylons extending from the v-tail surfaces of the tail 810. The pylons may house the motors driving the tail rotors 812, such as electric motors or fuel burning engines. The tail rotors 812 may be Samara type VTOL rotors which may be left exposed during cruise (i.e., not stowed). The tail rotors 812 may, or may not, be pitch and/or RPM controllable rotors. The motors driving the tails rotors 812 and front rotor 802 can be a combination of electric motors and fuel burning engines. In various embodiments, the tail rotors 812 may tilt, for example, forward, aft, starboard, port, and/or combinations of directions. Tilting of the tail rotors 812 and/or the front rotor 802, may change the orientation of the total sum force vector for the aircraft 800. For example, the two tail rotors 812 may vector in both the forward and aft direction and the starboard and port direction which may provide yaw control. This may enable a variety of potential flight configurations for forward flight (i.e., wing born flight), including: 1) a forward flight configuration in which the front rotor 802 is turned off, and not rotated down while the two aft rotors 812 are kept on and rotated to a forward thrust position; 2) a forward flight configuration in which the front rotor 802 is rotated down and kept on while the two aft rotors 812 are not rotated and shut down; and 3) a forward flight configuration in which all three rotors 802 and 812 are rotated into a forward facing position and kept on for forward flight (i.e., wing born flight).

Figure 12:
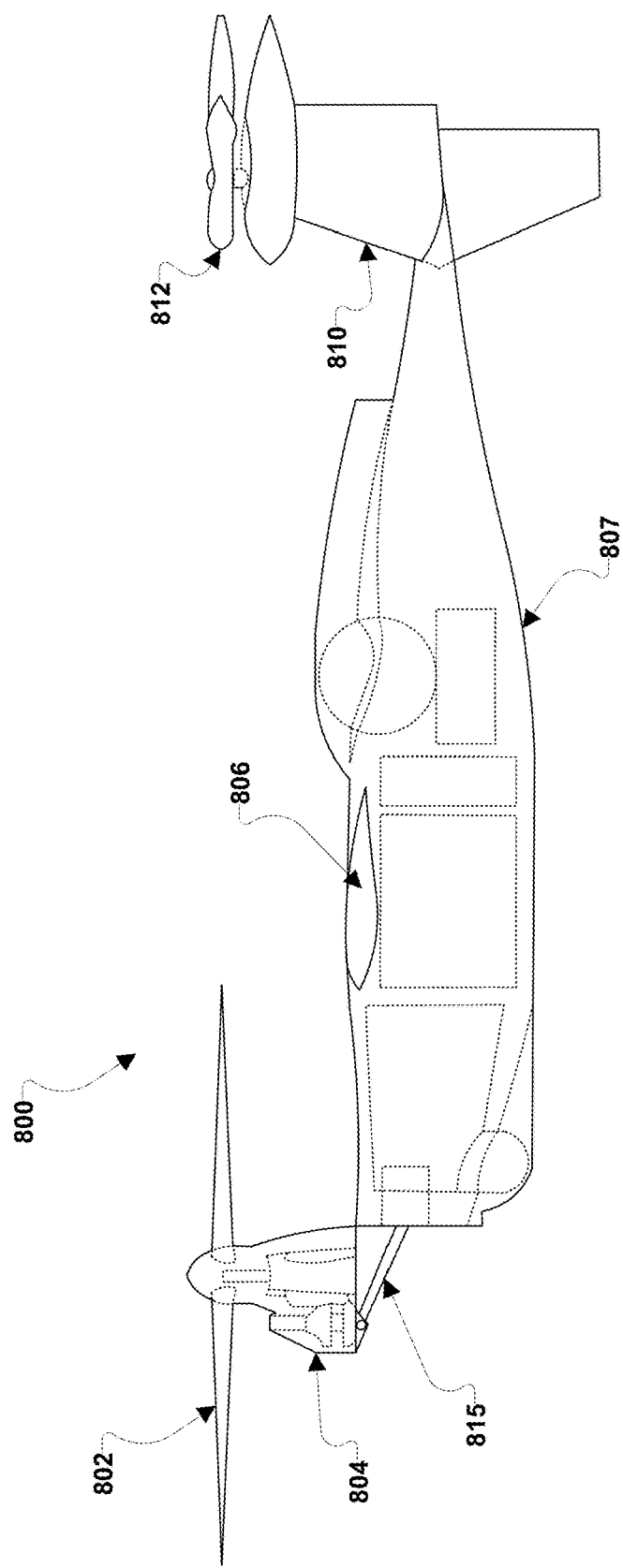
FIG. 12 is a component block diagram illustrating a left side view of the embodiment tri-rotor vehicle in a VTOL flight phase.

FIG. 12 is a component block diagram illustrating a left side view of the tri-rotor aircraft 800 in a VTOL flight phase. In the VTOL flight phase, front rotor 802 and engine 804 may be tilted up through a range of motion. The range of motion may be any range of motion, such as less than 90 degrees, 90 degrees, approximately 90 degrees, greater than 90 degrees, etc. The range of motion of the front rotor 802 may be less than 90 degrees in various embodiments in which the two tail rotors 812 may tilt forward and aft to provide a total sum force vector in the vertical direction. In an embodiment, the front rotor 802 and engine 804 may be tilted up in a portion of the fuselage 807 on a hinged structure controlled by an actuator 815, such as an extension arm, etc., to tilt from horizontal to vertical positions such that the front rotor 802 axis may be oriented vertically (e.g., perpendicular) to the fuselage 807. In an embodiment, the front rotor 802 and tail rotors 812 may all be driven by their respective motors in the VTOL flight phase. In the VTOL flight phase, the tail rotors 812 may be activated. Roll control and/or pitch control in the VTOL phase may be provided by speed control on the tail rotors 812. Yaw control in the VTOL phase may be provided by speed control on the tail rotors 812, as well as the physical mounting of the tail rotors 812, for example with a 20 degree cant. In an embodiment, the skids or other landing gear and the vertical surface of the tail 810 may be configured to support the aircraft 800 on the ground.

Figure 13:
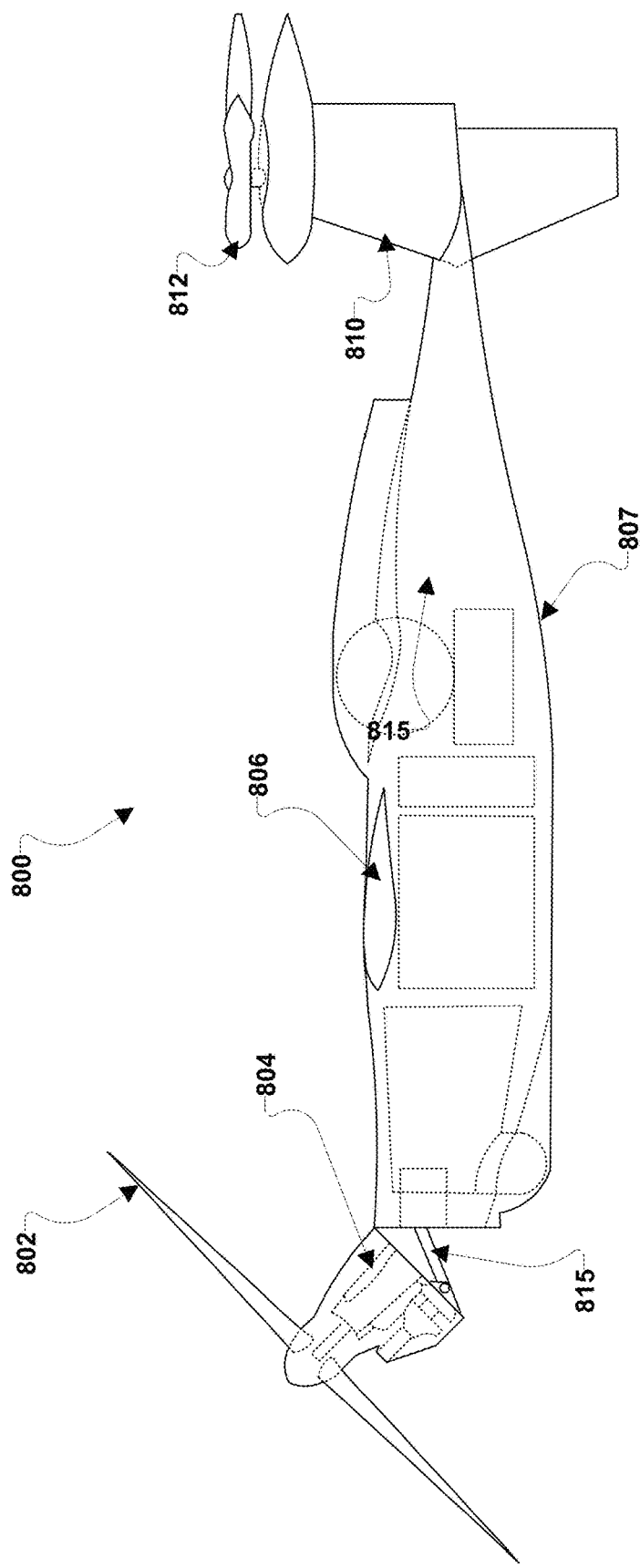
FIG. 13 is a component block diagram illustrating a left side view of the embodiment tri-rotor vehicle transitioning between the VTOL flight phase and a wing born flight phase.

FIG. 13 is a component block diagram illustrating a left side view of the embodiment tri-rotor aircraft 800 transitioning between the VTOL flight phase and a wing born flight phase. During the transition between VTOL flight and wing born flight the hinged portion of the fuselage 807 with the front rotor 802 and engine 804 may tilt (for example tilt down to transition from VTOL flight to wing born flight and tilt up to transition from wing born flight to VTOL flight). In an embodiment, the front rotor 802 and tail rotors 812, may all be driven by their respective motors in the transition phase. In another embodiment, less than all the rotors may be driven during the transition. Additionally, the landing skids or other type landing gear may retract or extend.

Figure 14:
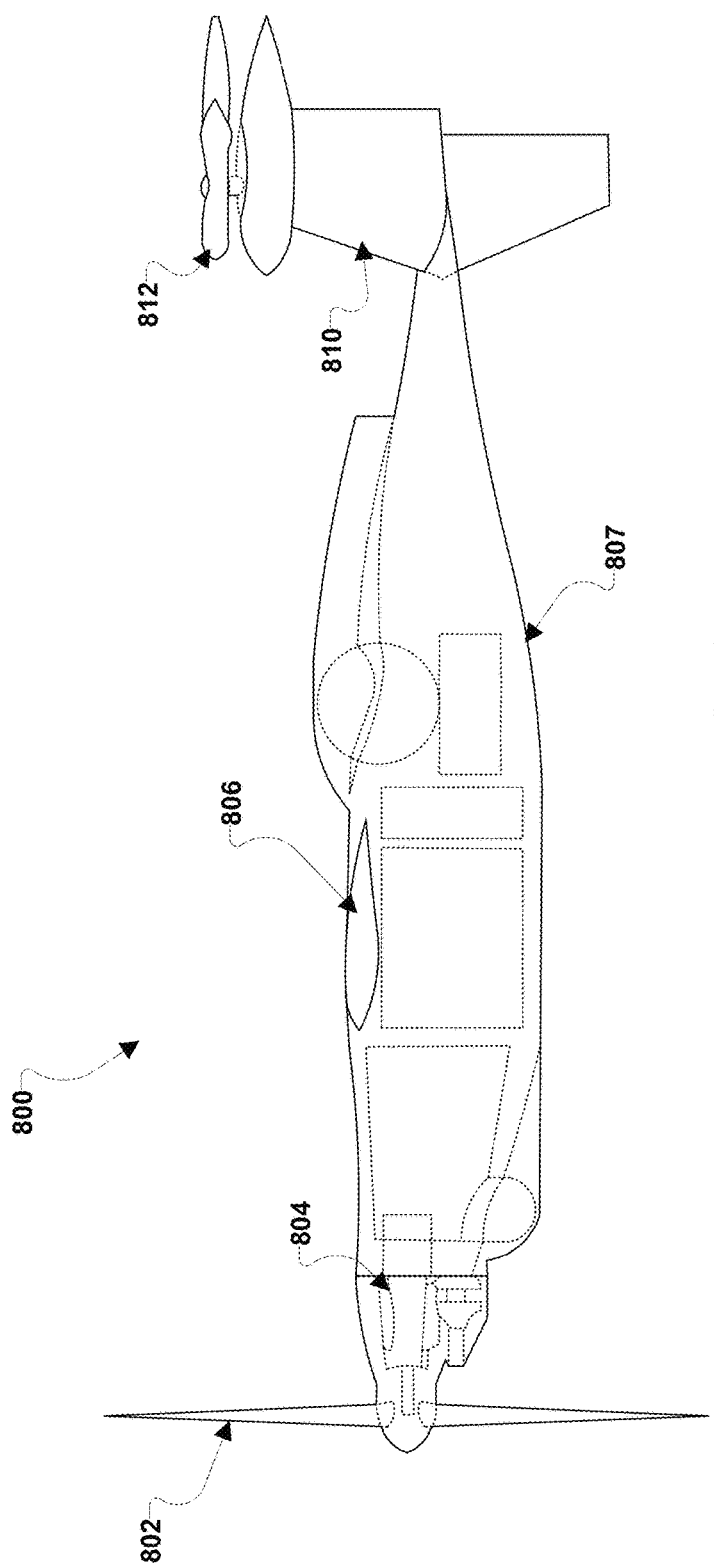
FIG. 14 is a component block diagram illustrating a left side view of the embodiment tri-rotor vehicle in the wing born flight phase.

FIG. 14 is a component block diagram illustrating a left side view of the embodiment tri-rotor aircraft 800 in the wing born flight phase. In the wing born flight phase, the hinged portion of the fuselage 807 with the front rotor 802 and engine 804 may be tilted down such that the front rotor 802 axis may be oriented horizontally (e.g., parallel) along the fuselage 807 and the front rotor 802 may act as a propeller, while the tail rotors 812 may be deactivated. During wing born flight, pitch may be controlled by elevators on the tail 810, roll may be controlled by the ailerons, and yaw may be controlled by the rudder on the tail 810.

Figure 15:
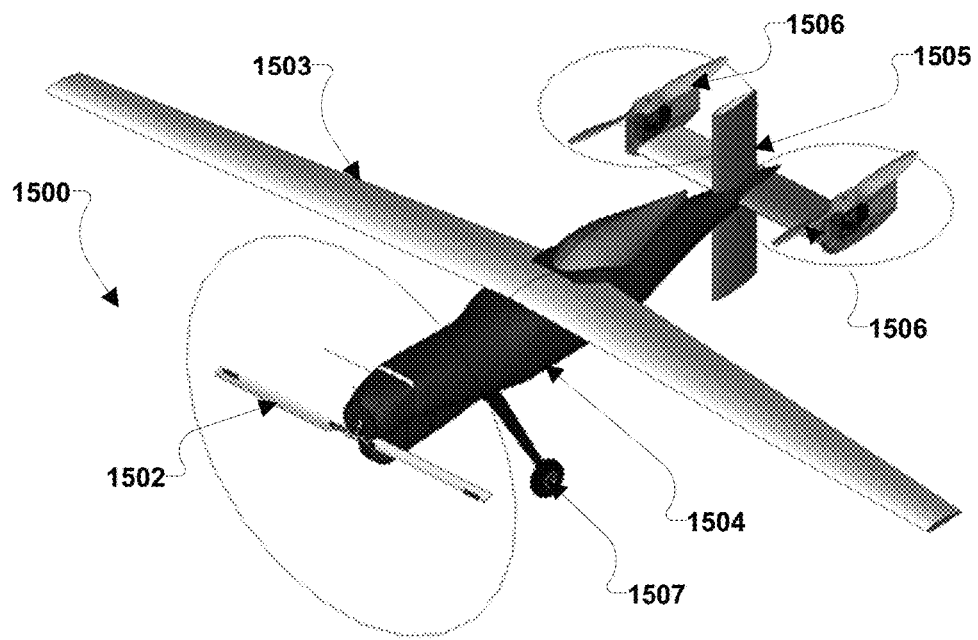
FIG. 15 is a component block diagram illustrating a front/left upper perspective view of a second embodiment tri-rotor vehicle in a wing born flight phase.
Figure 16:
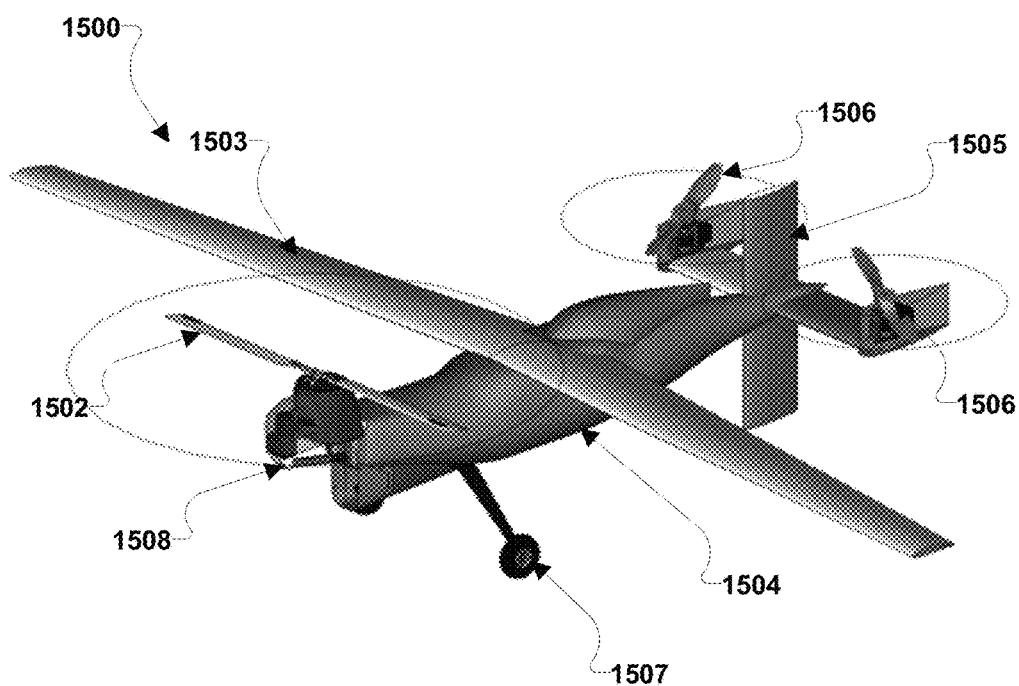
FIG. 16 is a component block diagram illustrating a front/left upper perspective view of the second embodiment tri-rotor vehicle in a VTOL flight phase.
Figure 17:
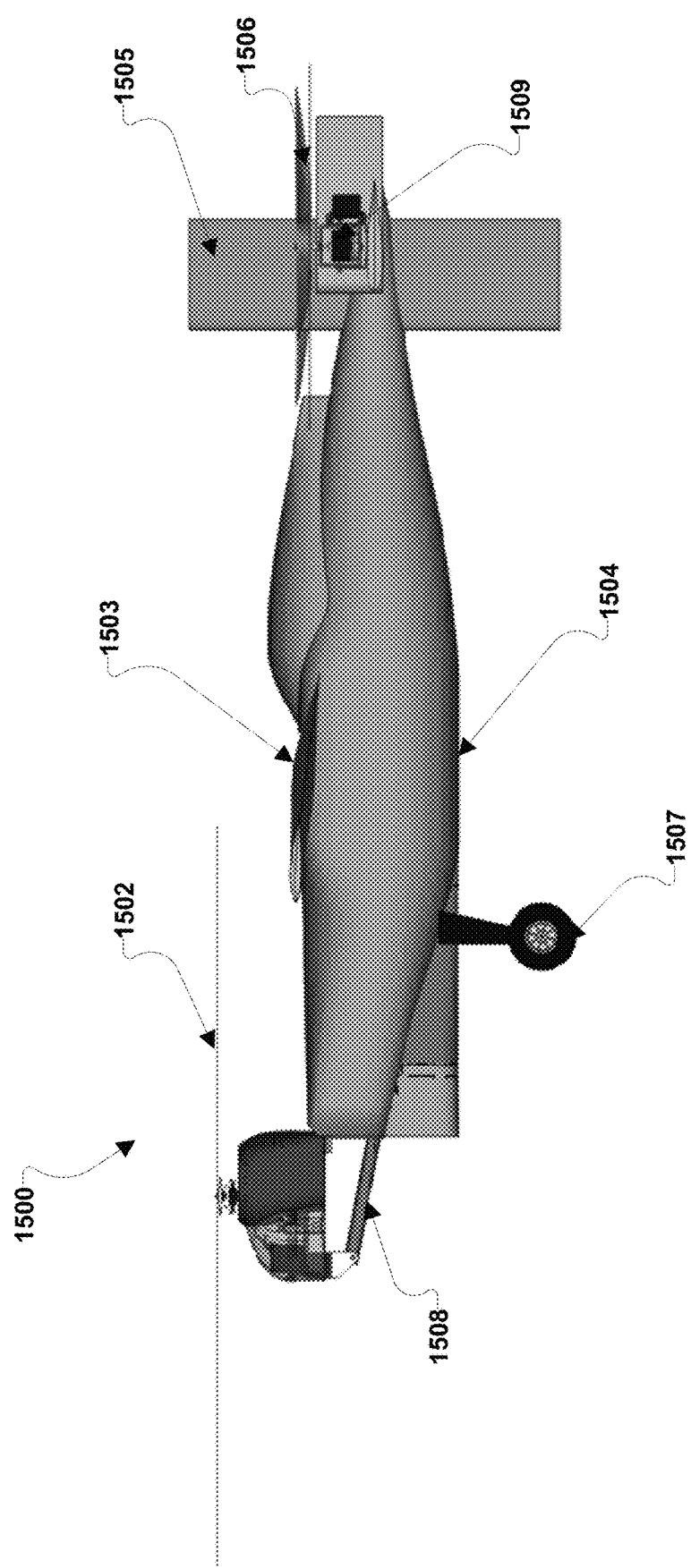
FIG. 17 is a component block diagram illustrating a left side view of the second embodiment tri-rotor vehicle in a VTOL flight phase.

FIGS. 15-17 illustrate various views of another embodiment tri-rotor vehicle, such as tri-rotor aircraft 1500. FIG. 15 is a component block diagram illustrating a front/left upper perspective view of aircraft 1500 in a wing born flight phase. Aircraft 1500 may include a front rotor 1502 and two tail rotors 1506. The tri-rotor aircraft 1500 may include a fixed wing 1503, fuselage 1504, and tail 1505. Similar to aircraft 800 described above, in aircraft 1500 the front rotor 1502 may be mounted at the front of the fuselage 1504 on a hinged portion of the fuselage 1504 that may house the motor driving the front rotor 1502. The two tail rotors 1506 may be mounted on the tail 1505. The aircraft 1500 may also include landing gear 1507.

In the wing born flight phase, the hinged portion of the fuselage 1504 with the front rotor 1502 and engine may be tilted down such that the front rotor 1502 axis may be oriented horizontally (e.g., parallel) along the fuselage 1504 and the front rotor 1502 may act as a propeller, while the tail rotors 1506 may be deactivated (e.g., allowed to weather-vane, oriented such that the long axis is aligned with the air flow (e.g., via the use of the motor magnets, external magnets, or other fixtures), etc.). FIG. 16 is a component block diagram illustrating a front/left upper perspective view of the tri-rotor aircraft 1500 in a VTOL flight phase. In the VTOL flight phase, front rotor 1502 and engine may be tilted up, such as to 90 degrees. In an embodiment, the front rotor 1502 and engine may be tilted up in a portion of the fuselage 1504 on a hinged structure controlled by an actuator 1508, such as an extension arm, etc., to tilt from horizontal to vertical positions such that the front rotor 1502 axis may be oriented vertically (e.g., perpendicular) to the fuselage 1504. In an embodiment, the front rotor 1502 and tail rotors 1506 may all be driven by their respective motors in the VTOL flight phase. FIG. 17 is a component block diagram illustrating a left side view of the tri-rotor aircraft 1500 in a VTOL flight phase. In FIG. 17, the engine 1509 mounted in a pylon of the tail 1505 to drive the left tail rotor 1506 is illustrated.

Figure 18:
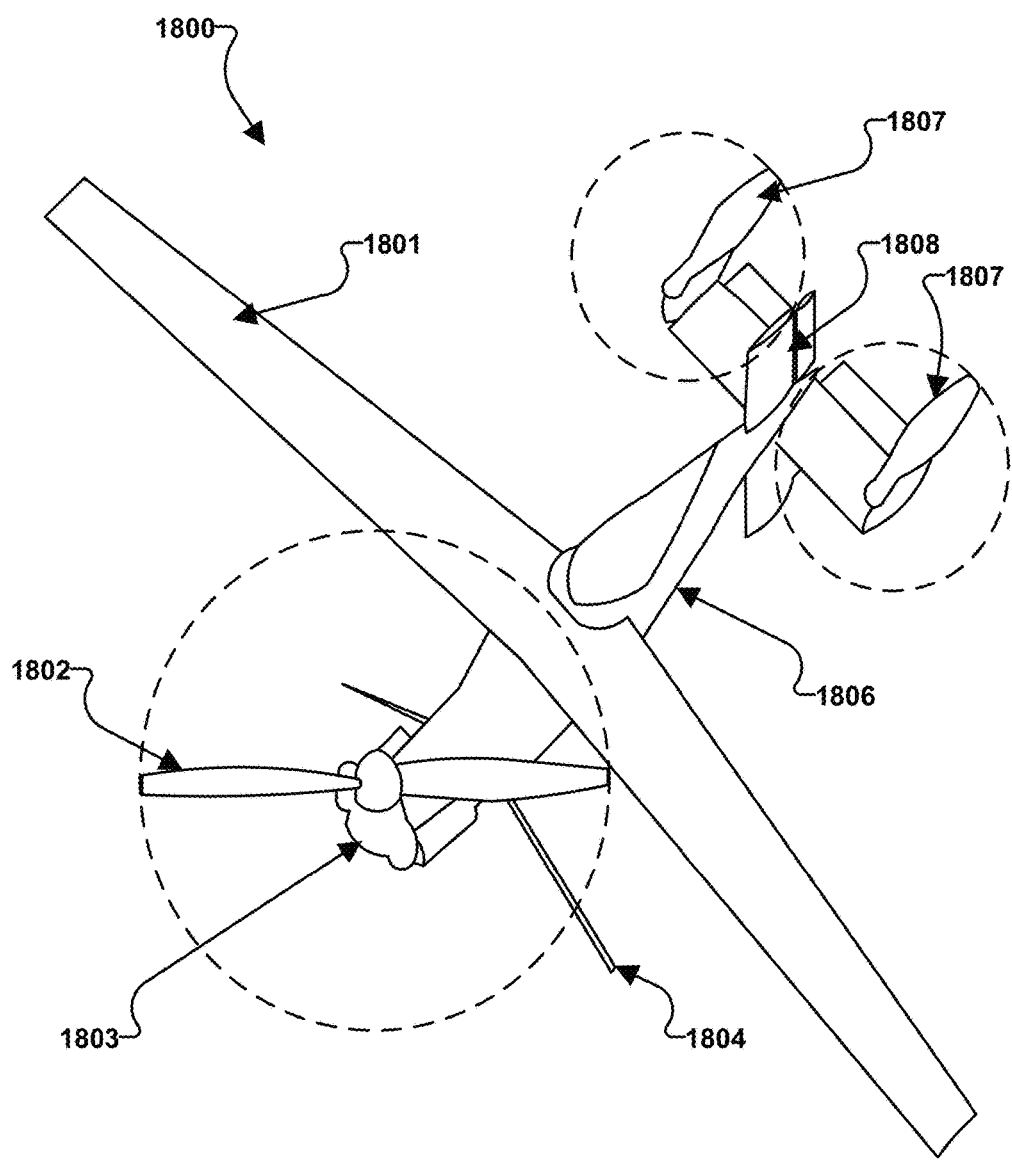
FIG. 18 is a component block diagram illustrating a front/left upper perspective view of a third embodiment tri-rotor vehicle in a VTOL flight phase.
Figure 19:
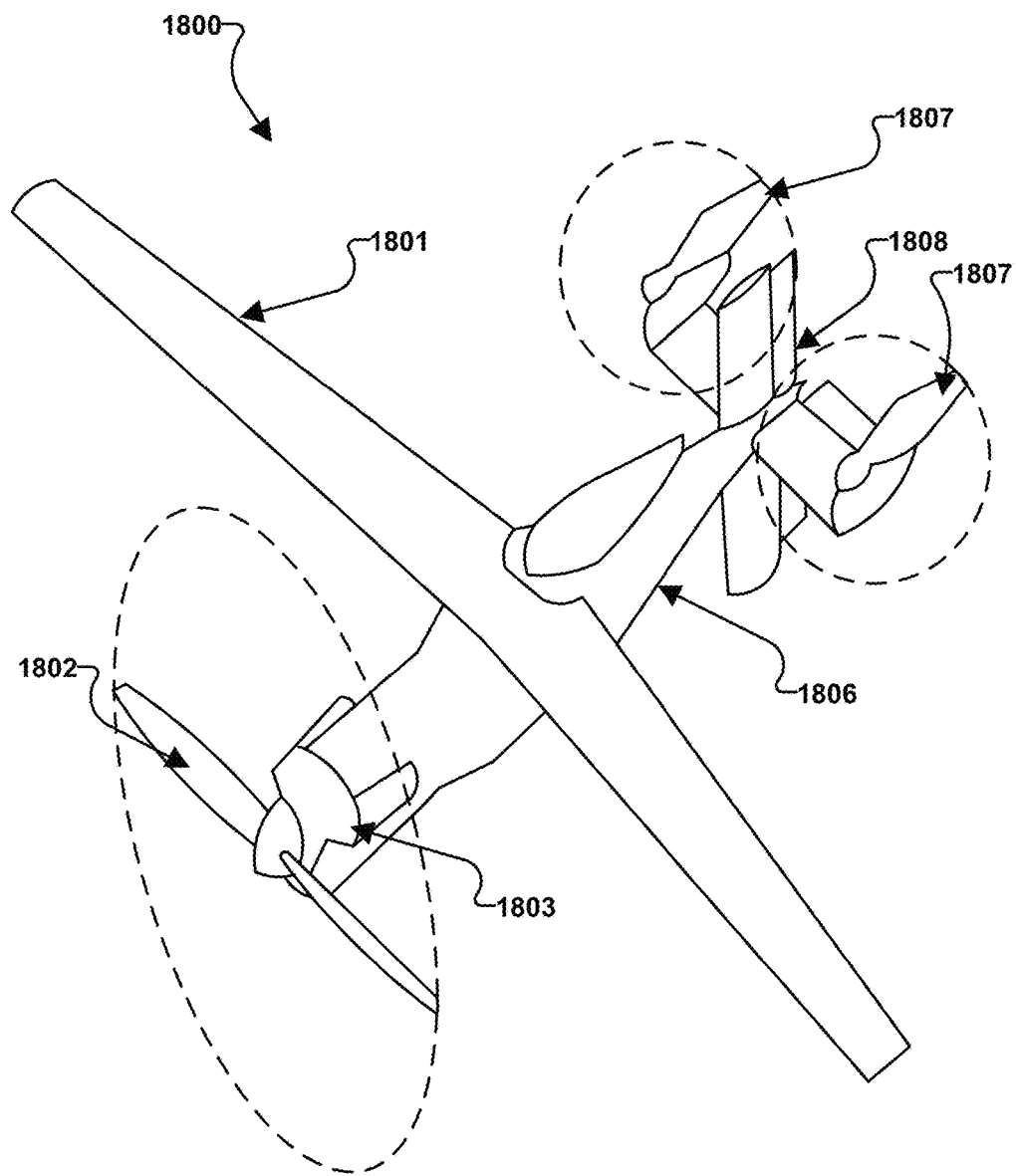
FIG. 19 is a component block diagram illustrating a front/left upper perspective view of the third embodiment tri-rotor vehicle in a wing born flight phase.
Figure 20:
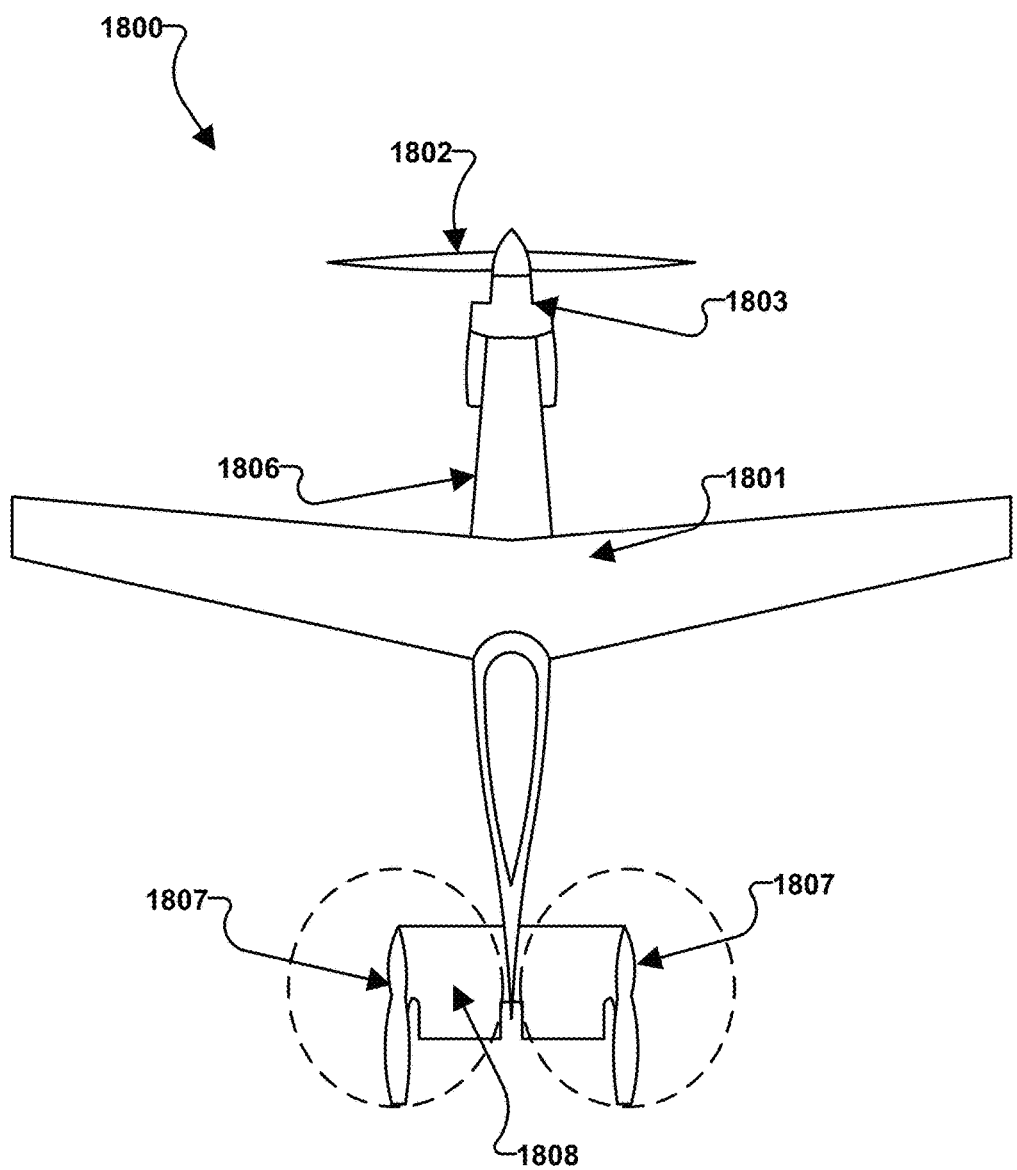
FIG. 20 is a component block diagram illustrating a top view of the third embodiment tri-rotor vehicle in a wing born flight phase.

FIGS. 18-20 illustrate various views of another embodiment tri-rotor vehicle, such as tri-rotor aircraft 1800. FIG. 18 is a component block diagram illustrating a front/left upper perspective view of the tri-rotor aircraft 1800 in a VTOL flight phase, FIG. 19 is a component block diagram illustrating a front/left upper perspective view oft the tri-rotor aircraft 1800 in a wing born flight phase, and FIG. 20 is a component block diagram illustrating a top view of the tri-rotor aircraft 1800 in a wing born flight phase. Aircraft 1800 may include a front rotor 1802 and two tail rotors 1807.

The tri-rotor aircraft 1800 may include a fixed wing 1801, fuselage 1806, and tail 1808. In an embodiment, the wing of aircraft 1800 may be a forward swept wing. In an embodiment, the tail rotors 1807 may be Samara type VTOL rotors. Similar to aircrafts 800 and 1500 described above, in aircraft 1800 the front rotor 1802 may be mounted at the front of the fuselage 1806 on a hinged portion 1803 of the fuselage 1806 that may house the motor driving the front rotor 1802. The two tail rotors 1807 may be mounted on the tail 1808. The aircraft 1800 may also include landing skids 1804 that may be extended in the VTOL phase and retracted in the wing born flight phase. In the VTOL flight phase, front rotor 1802 and engine may be tilted up, such as to 90 degrees. In an embodiment, the front rotor 1802 and engine may be tilted up in the hinged portion 1803 by an actuator, such as an extension arm, etc., to tilt from horizontal to vertical positions such that the front rotor 1802 axis may be oriented vertically (e.g., perpendicular) to the fuselage 1806. In an embodiment, the front rotor 1802 and tail rotors 1807 may all be driven by their respective motors in the VTOL flight phase.

In an embodiment, the center of gravity (CG) of the aircraft 1800 may be 1.53 ft aft of the front motor 1802 rotation point. The CG range may be +/−0.05 ft. The weight of the aircraft 1800 may be 31 lbs. The wing loading may be 4.7 lbs/ft$^2$ and the disk loading may be 2.0 lbs/ft$^2$. The stall speed may be approximately 60 ft/sec (35 kts), and the aircraft 1800 may cruise at approximately 75 ft/sec (44 kts). The lift to drag ratio (L/D) should approximately be 16. The fuselage 1806 may be constructed to two primary segments. The forward fuselage may be the hinged portion 1803 that rotates with the front rotor 1802, while the main portion of the fuselage 1806 remains stationary. Fuselage 1802 length, from tip of spinner to tip of tail cone, may be 5.59 ft. The main fuselage 1802 may have a cutout for the wing carry through. The cutout may be shaped to hold the wing at a 6 degree incidence angle. The construct of the wing 1801 may be with a 3 degree twist (i.e. the wing tips are at a 3 degree trailing edge up than the wing root). There may also be 0 degrees of dihedral in the wing 1801. There may be −5 deg of sweep at the 25% chord location (leading edge of tip airfoil may be 0.3005 feet forward of leading edge of root airfoil). Thus, the reference area may equal 6.54 ft$^2$, the half span may be 4.955 ft, the wing carry over span may be 0.35 ft, the flap span may be 2.3025 ft, the aileron span may be 2.3025 ft, the root chord may be 0.85 ft, the tip chord may be 0.4406 ft, and the wing carry through chord may be 0.55 ft. The wing carry over may use the same root airfoil, but cut away 0.3 ft from the trailing edge. Flaps and ailerons may be incorporated into the wing 1801. The flaps and ailerons may be 15% of the local chord length. In order to prevent the need for custom high torque servos, the flap may be installed separate from the aileron with independent servos. This may also give the ability to program differential flaperons (e.g., use 4 channels (1 for left aileron, 1 for left flap, 1 for right flap and 1 for right aileron). The leading edge of the wing root may be 1.47 ft aft of the front motor rotation point.

The tail 1808 may be constructed with 0 twist, 0 dihedral, and un-tapered. The chord length of both the horizontal and vertical portions of the tail 1808 may be 0.55 ft. The span of the horizontal tail may be 2.1 ft. Note this span does not include the pods that fair over the rear lift motors. The span of the vertical tail may be 1.85 ft. The elevators and rudders may be 50% of the chord length. The Elevator may need to move through +10 to −90 degrees. Note + is trailing edge up. For hover the elevator may need to be −90 degs. For forward flight the elevator may need to move to +/−10 degs. The rudder may move +/−10 degs. The same templates may be used for the horizontal and vertical tails. In order to make the vehicle easier to fly, elevator and rudder extensions may be used. These extensions may be analogous to training wheels on a bike. These extensions may increase the elevator and rudder chord by 0.25 ft. These extensions may be attached to the elevators and rudders in a removable way or may be new elevators and rudders that may be swapped out with the proper size elevators and rudders. For hover flights, the bottom of the vertical tail may be one of the three landing points along with the two front skids 1804. The bottom of the vertical tail may be reinforced in order to protect the rudder when it is resting on the ground. These skids 1804 may retract inward and aft into slots in the fuselage 1806. The aircraft 1800 may be at rest on the skids 1804 with waterline 0 of the fuselage 1806 parallel to the ground. The leading edge of the horizontal tail may be 4.22 ft aft of the front motor rotation point. The leading edge of the vertical tail may be 4.02 ft aft of the front motor rotation point. This aircraft 1800's configuration may be prone to have a center of gravity too far aft. Removing excess weight from the tail may adjust the center of gravity.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A tri-rotor vehicle, comprising:
  a wing having no rotors coupled thereto;
  a tail comprising two horizontal tail sections;
  a fuselage;
  two tail rotors coupled to the tail, wherein the two horizontal tail sections extend horizontally relative to the fuselage and from opposite sides of the fuselage, wherein each of the two tail rotors has a single corresponding respective horizontal tail section, and wherein each of the two tail rotors is coupled only to its own respective one of the two horizontal tail sections and is configured to tilt through a range of motion; and
  a front rotor coupled to the fuselage, wherein the front rotor is configured to tilt through a range of motion and the vehicle is configured to transition between a wing born flight phase and a VTOL flight phase by the front rotor tilting through the range of motion, and wherein during the wing born flight phase the front rotor is tilted up and is deactivated while the two tail rotors are activated and tilted forward.

2. The tri-rotor vehicle of claim 1,
  wherein the front rotor is coupled to a front hinged portion of the fuselage controlled by an actuator to tilt through the range of motion.

3. The tri-rotor vehicle of claim 1, wherein the two tail rotors are coupled to the tail such that rotor axes of each of the two tail rotors are configured to orient vertically relative to the fuselage during the VTOL flight phase.

4. The tri-rotor vehicle of claim 3, wherein the front rotor and two tail rotors are not pitch controlled rotors.

5. The tri-rotor vehicle of claim 4, wherein the two tail rotors are coupled to the tail at a canted angle.

6. The tri-rotor vehicle of claim 3, wherein the tail is a v-tail.

7. The tri-rotor vehicle of claim 3, wherein the wing is swept.

8. The tri-rotor vehicle of claim 3, wherein the vehicle is an unmanned aerial vehicle.

9. The tri-rotor vehicle of claim 3, further comprising retractable landing skids, wherein the tail is configured to act as a rear landing skid.

10. The tri-rotor vehicle of claim 1, wherein the two tail rotors are Samara VTOL rotors.

11. The tri-rotor vehicle of claim 1, wherein the front rotor and two tail rotors are cyclic and collective controlled rotors.

12. The tri-rotor vehicle of claim 11, further comprising a front rotor motor configured to directly drive the front rotor and two tail rotor motors, each tail rotor motor configured to drive a respective one of the tail rotors, wherein the front rotor motor is a fuel burning engine and each of the two tail rotor motors is selected from the group consisting of a fuel burning engine and an electric motor.

13. The tri-rotor vehicle of claim 1, wherein
the two tail rotors are coupled to the tail such that the two tail rotors are configured to tilt forward, aft, starboard, and port.

14. A tri-rotor vehicle, comprising:
a wing having no rotors coupled thereto;
a tail comprising two horizontal tail sections;
a fuselage;
two tail rotors coupled to the tail, wherein the two horizontal tail sections extend horizontally relative to the fuselage and from opposite sides of the fuselage and wherein each of the two tail rotors is coupled to its own respective one of the two horizontal tail sections; and
a front rotor coupled to the fuselage, wherein the front rotor is configured to tilt through a range of motion; and
wherein the two tail rotors are configured to be stowed in pods on the tail during a wing born flight phase and are held in place by one or more magnets such that a long axis of each of the two tail rotors is aligned with airflow over the vehicle.

15. A tri-rotor vehicle, comprising:
a wing having no rotors coupled thereto;
a tail comprising two horizontal tail sections;
a fuselage;
two tail rotors coupled to the tail, wherein the two horizontal tail sections extend horizontally relative to the fuselage and from opposite sides of the fuselage, wherein each of the two tail rotors has a single corresponding respective horizontal tail section, and wherein each of the two tail rotors is coupled only to its own respective one of the two horizontal tail sections; and
a front rotor coupled to a front hinged portion of the fuselage controlled by an actuator, wherein the front rotor is configured to tilt through a range of motion by control of the actuator and wherein the vehicle is configured to transition between a wing born flight phase and a VTOL flight phase by the front rotor tilting through the range of motion; and
a front rotor motor configured to drive the front rotor and two tail rotor motors, each tail rotor motor configured to drive a respective one of the tail rotors, wherein the front rotor motor is selected from the group consisting of a fuel burning engine and an electric motor and each of the two tail rotor motors is selected from the group consisting of a fuel burning engine and an electric motor,
wherein:
the two tail rotors are coupled to the tail such that rotor axes of each of the two tail rotors are activated and configured to orient horizontally relative to the fuselage during the wing born flight phase;
the front rotor is deactivated and configured to orient vertically relative to the fuselage during the wing born flight phase; and
the front rotor and two tail rotors are cyclic and collective controlled rotors.

* * * * *